March 27, 1951 R. O. RIPPERE 2,546,835
CODE RECORDING CONTROL CIRCUIT
Filed June 24, 1949 18 Sheets-Sheet 1

INVENTOR
R. O. RIPPERE
BY John A. Hall
ATTORNEY

March 27, 1951 R. O. RIPPERE 2,546,835
CODE RECORDING CONTROL CIRCUIT
Filed June 24, 1949 18 Sheets-Sheet 2
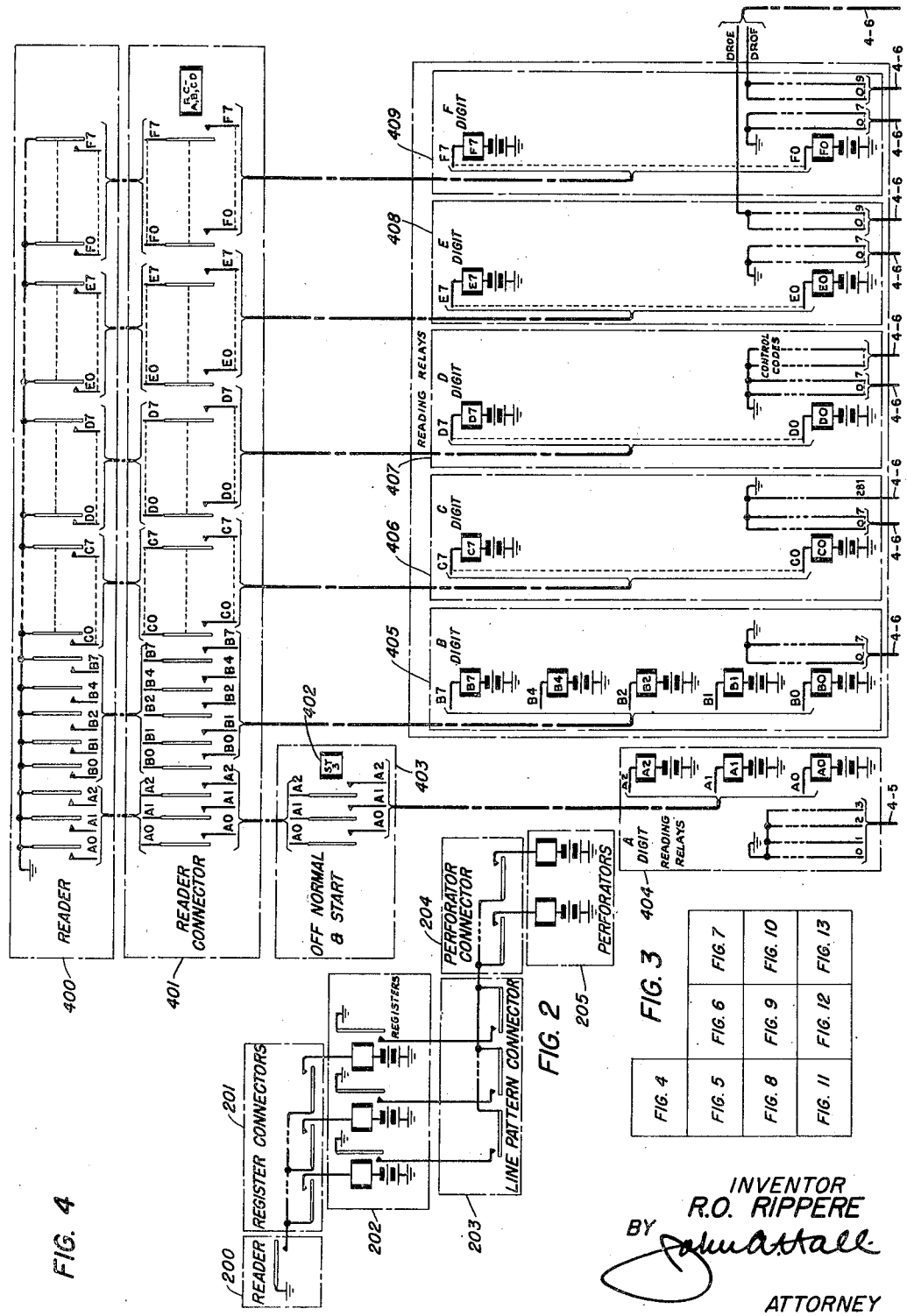
INVENTOR
R.O. RIPPERE
BY
ATTORNEY INVENTOR
R.O. RIPPERE
BY John A. Hall
ATTORNEY March 27, 1951

R. O. RIPPERE 2,546,835

CODE RECORDING CONTROL CIRCUIT

Filed June 24, 1949

INVENTOR
R.O. RIPPERE
BY
John A. Hall
ATTORNEY

March 27, 1951 R. O. RIPPERE 2,546,835
CODE RECORDING CONTROL CIRCUIT
Filed June 24, 1949 18 Sheets-Sheet 6

INVENTOR
R.O. RIPPERE
BY
ATTORNEY

INVENTOR
R. O. RIPPERE
BY John A. Hall
ATTORNEY

INVENTOR
R.O. RIPPERE
BY John A. Hall
ATTORNEY

March 27, 1951 R. O. RIPPERE 2,546,835
CODE RECORDING CONTROL CIRCUIT
Filed June 24, 1949 18 Sheets-Sheet 11

INVENTOR
R.O. RIPPERE
BY
ATTORNEY

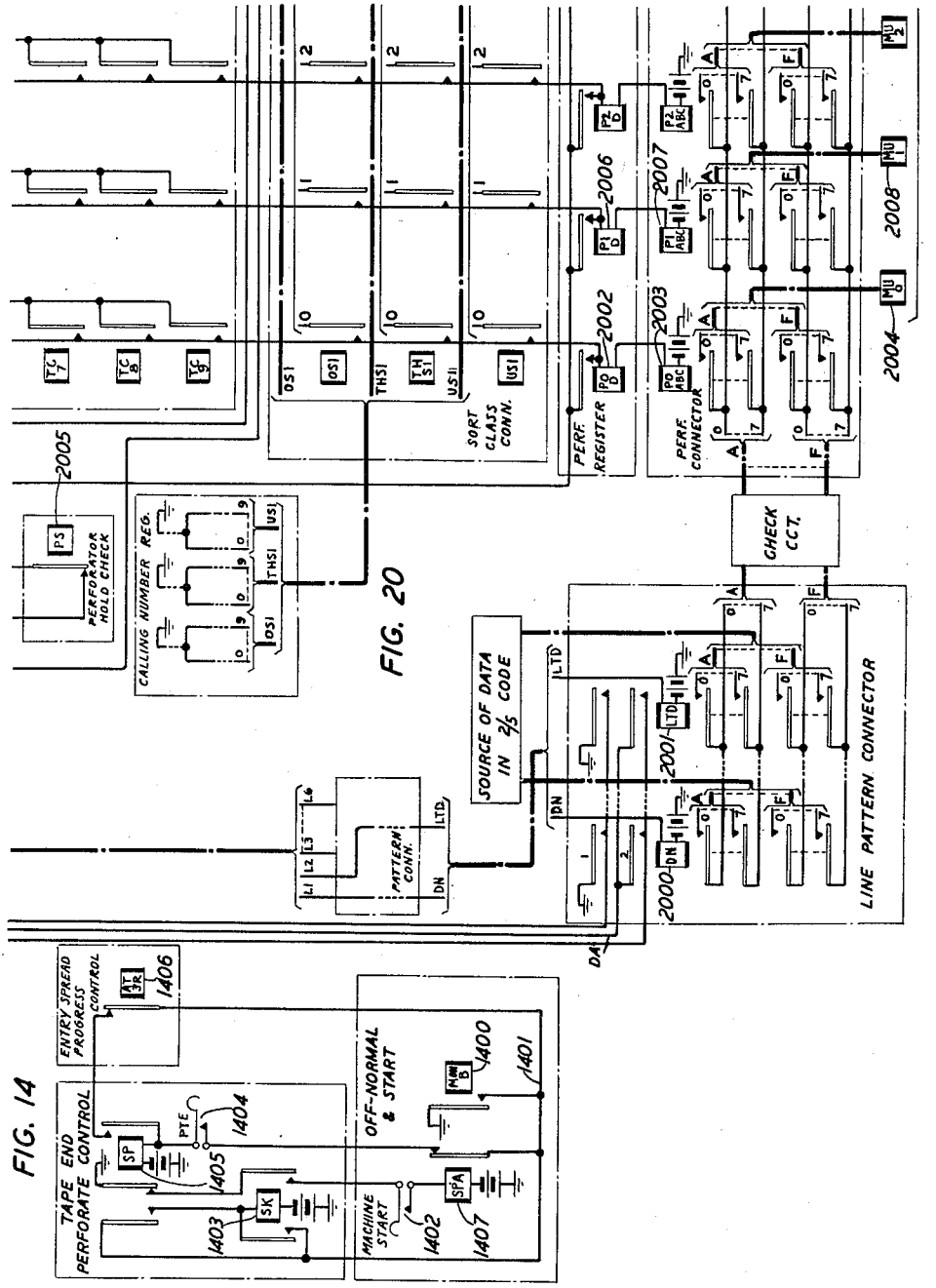

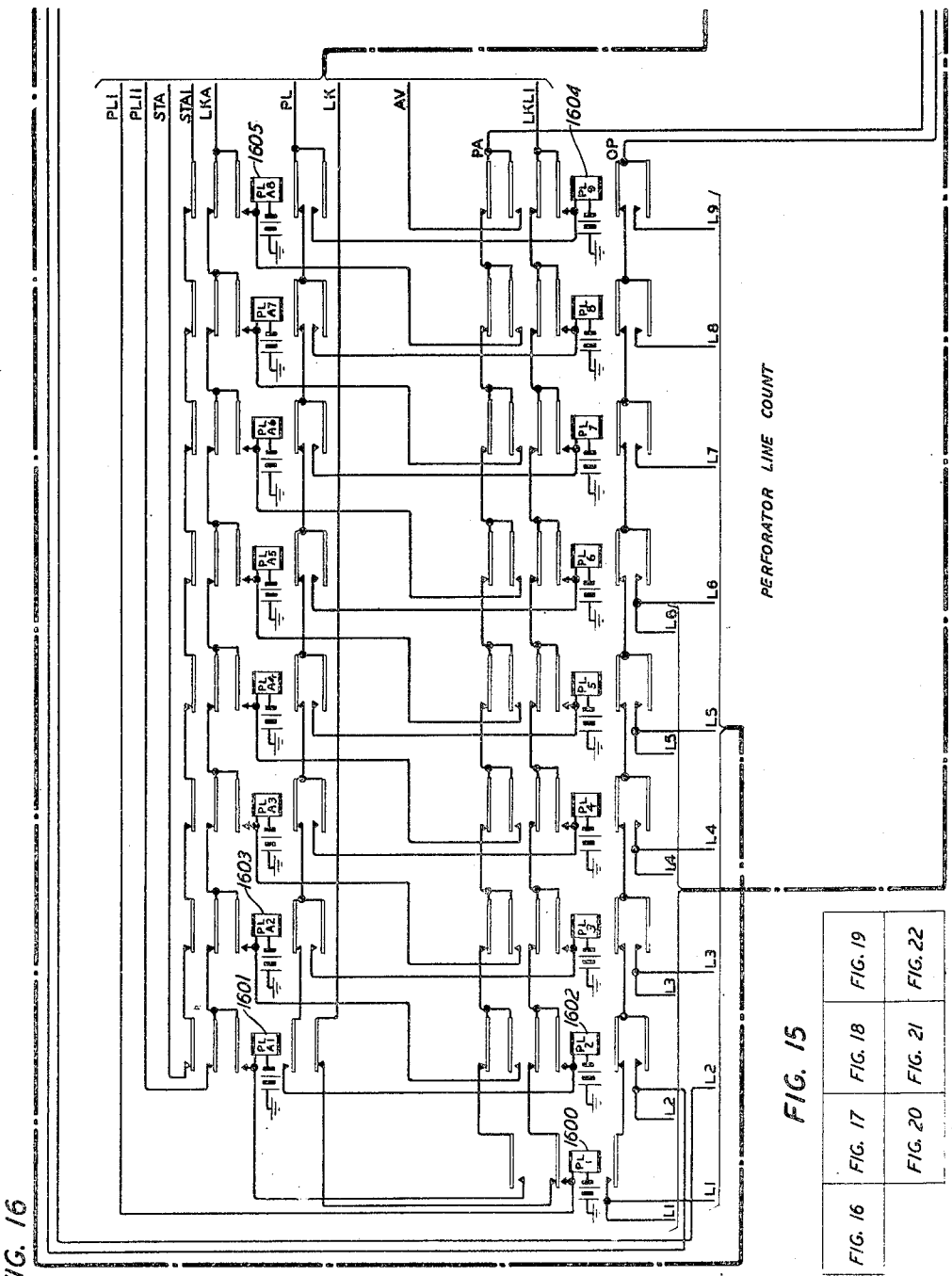

March 27, 1951      R. O. RIPPERE      2,546,835

CODE RECORDING CONTROL CIRCUIT

Filed June 24, 1949      18 Sheets-Sheet 14

FIG. 17

INVENTOR
R. O. RIPPERE
BY
ATTORNEY

FIG. 18

March 27, 1951 R. O. RIPPERE 2,546,835
CODE RECORDING CONTROL CIRCUIT
Filed June 24, 1949 18 Sheets-Sheet 16

INVENTOR
R. O. RIPPERE
BY
ATTORNEY

INVENTOR
R. O. RIPPERE
BY
ATTORNEY

March 27, 1951 R. O. RIPPERE 2,546,835
CODE RECORDING CONTROL CIRCUIT

Filed June 24, 1949 18 Sheets-Sheet 18

INVENTOR
R. O. RIPPERE
BY
John Attall
ATTORNEY

Patented Mar. 27, 1951

2,546,835

UNITED STATES PATENT OFFICE 2,546,835

CODE RECORDING CONTROL CIRCUIT

Robert O. Rippere, Massapequa, N. Y., assignor to Bell Telephone Laboratories, Incorporated, New York, N. Y., a corporation of New York Application June 24, 1949, Serial No. 101,086

15 Claims. (Cl. 164—113)

This invention relates to automatic accounting systems and particularly to systems wherein records automatically produced by and of customer uses of given facilities over variable time periods are processed by electrical devices in a number of steps to produce customer bills for the services rendered.

The object of the invention is to provide means for collecting the data from various and scattered sources in the records, and to translate the records into the form required for printing.

The present invention resides in a plurality of circuit details of one of the electrical devices employed for one step in the automatic accounting process, that device known as the computer, but computing, in itself, is not here claimed. This device, like the other devices employed, is arranged to take records from an incoming or old perforated tape, to modify the records in accordance with the purposes for which it is adapted and to produce a plurality of outgoing or new perforated tapes therefrom.

The original tape, automatically produced by customer use of given facilities contains scattered items of specific information, such as the initial entry, the answer or start time and the disconnect or termination time for each customer use and other items of general information, such as the general location of the using customer's facilities, the date, the hours and the identity of the billing period. This tape in a specific arrangement of an accounting system is employed as an incoming tape in a device known as an assembler, which collects or assembles the various and scattered items of specific information.

The next step in the accounting process is performed in the computer which takes the assembled items of specific information, calculates therefrom elapsed time, modifies the result in accordance with a billing index which indicates the rate of charges, translates this result into a number of unit charges (message units in an automatic message accounting system) and distributes the calculated charges along with accompanying details to one or another of a plurality of outgoing tapes.

In a specific embodiment of the invention the computer is provided with a reader for entering data from an incoming tape into its calculator and registers and nineteen perforators for distributing the processed data to nineteen outgoing tapes. There will be ten of such perforators assigned to the recording of message unit charges. If the tape is from a marker group serving more than one office, then as many of these perforators as there are offices will be used so that a separate outgoing tape for each office will be prepared. If the marker group contains but a single office then the charges will be sorted on a decimal basis either in accordance with the thousands digit of the called line number or in accordance with the units digit thereof. There will be six of such perforators assigned to the recording of detail calls, that is calls, the details of which will be reported on the customers' bills. Since the central office tapes are recorded by "rounds" and since the longest round provided for will consist of six days, then six perforators are provided so that the detail calls may be sorted by days. There will be one perforator assigned to the recording of irregular calls such as straddle calls or those occasional calls which exceed the capacity of the device such as those extending over a period of time greater than ninety-nine minutes. There will be one perforator assigned to the recording of the details of message unit calls where these details are sought for monitoring or other purposes by the customer. The customer's bill will nevertheless be rendered on the message unit basis so that a particular message unit call will be processed by the computer and two records produced therefrom, one in short form on one of the regular message unit tapes for billing purposes and another in longer form on the message unit detail record tape for supervisory purposes. And lastly there will be one perforator assigned to record the line observed calls, that is, a record made of all calls originated on certain lines put under observation under routine or on account of customer complaints.

The first seventeen output tapes including the ten message unit tapes, the six detail call tapes and the irregular call tape will contain billing information whereas the last two, the message unit detail call and the line observed call tapes will contain reference information. The distribution of calls to these nineteen outgoing channels is a function of the computer and in most cases is controlled by some index in the initial entry of each call, but may in other cases be controlled by extraordinary conditions derived or detected by the computer itself, as when the elapsed time calculated exceeds two digits (99 minutes). Thus, the computer translates, calculates, computes, sorts and otherwise rearranges the items of information found on an incoming tape to form a plurality of outgoing tapes carrying the thus processed information in another form.

By way of illustration, a number of examples of assembled call information as they appear on the incoming tape and as they are transformed for perforation on one or another of the outgoing tapes are given, with a short explanation of certain features of the transformation.

(1) A message unit call entered as:

$$135246$$
$$131746$$
$$213046$$
$$005444$$

which is a call made from office 0 of the given marker group (identified in the tape identity entries) from calling line 5444, and extending from 31.7 minutes to 35.2 minutes. The billing index (3), we will assume will cause the calculation of 3.5 minutes of elapsed time to indicate 2 message units, so that the computer will form and cause to be perforated on the number 5 perforator (thousands digit of calling line number, assuming a single office in the given marker group) the following output line:

$$125444$$

(2) A message unit call entered as:

$$135237$$
$$117537$$
$$214037$$
$$031234$$

which is a call from office 3 of the given marker group (identified in the tape identity entries) from calling line 1234 and extending from 17.5 minutes to 35.2 minutes. The billing index (4) we will assume will cause the calculation of 18.7 minutes of elapsed time to indicate 12 message units so that the computer will form and cause to be perforated on the number 3 perforator (sorted by office when the marker group contains more than one office) two output lines:

$$201234$$
$$000012$$

(3) A message unit call entered as:

$$101673$$
$$281021$$
$$156273$$
$$213073$$
$$005444$$

is one very similar to Example No. 1 except that it also includes an hour entry. The elapsed time is calculated as follows:

$$+01.6$$
$$+60.0$$
$$-56.2$$
$$\overline{\phantom{xxxx}}$$
$$+5.4$$

If this in combination with the billing index indicates 3 message unit calls then the output will be:

$$135444$$

(4) A message unit call might appear as:

$$101652$$
$$281899$$
$$156252$$
$$213052$$
$$005444$$

The second line in this case is known as an irregular hour entry and while it does not show the actual hour it nevertheless sets the hour circuit back an hour so that the calculation is identical with Example No. 3 and the output line will be:

$$135444$$

(5) Should a call appear as follows:

$$101657$$
$$281021$$
$$281020$$
$$156257$$
$$213057$$
$$005444$$

then the calculation of elapsed time would be as follows:

$$+01.6$$
$$+120.0$$
$$-56.2$$
$$\overline{\phantom{xxxx}}$$
$$+65.4$$

Assuming that this elapsed time will indicate 27 message units, the output becomes:

$$235444$$
$$000027$$

(6) If the line 5444 of Example No. 1 were under observation, then the input to the computer would be as follows:

$$135246$$
$$131746$$
$$243046$$
$$005444$$
$$051133$$
$$010000$$

The entry index (the B digit of the first line of the initial entry) is 4 instead of 1 as in the first example, and two supplementary lines giving details of the called number are added. In this case the computer forms and causes to be perforated on the number 5 perforator, as before, the output line:

$$125444$$

This is billing information and will eventually be the data from which the customer's bill is made up.

In addition the computer forms and causes to be perforated on the line observation tape the following:

$$105444$$
$$062511$$
$$051133$$
$$010000$$
$$000402$$

This is supervisory information and is not used in forming bills but goes to company officials for various purposes such as routine checking, or for answering complaints, etc. The second line is formed by a translator from an assumed date (15), hour (21) and answer time (31). The third and fourth lines are copies of the last two lines of the assembled call and the last line has a record of the message unit index (0), the chargeable time (04—rounded off from 3.5) and the number of message units charged (02).

(7) In Example No. 6 if the third line had been 233046 instead of 243046 then a message unit detail call is indicated. In such case the output line will be 125444 as before and the five-line detail information record will be exactly the same except that it will be perforated on the MUD tape instead of the LO tape and will eventually go to the business office instead of to the customer.

(8) A detail call read from the incoming tape as:

```
135213
131713
239013
005444
051133
010000
``` will be processed and distributed to the detail call output tape as:

```
105444
062511
051133
010000
000400
```

The first line of this output gives the calling line number. The second line is the start time line which is synthesized from the day (15), the hour (21) and minutes (31). The third and fourth lines are copies of the last two lines of the call as entered and the last line shows the chargeable time as 04 minutes. Note the difference between this and Example No. 6 where the number of message units (02) appeared as the last two digits of the last line. In the present case the message billing index (9) in the third line 239013 of the entries read from the incoming tape is a means which causes the last two digits of the last line of the processed call perforated on the detail call tape to be blanked out as 00.

(9) With a very slight difference, the digit 4 instead of the digit 3 as the B (or second) digit of the first line of the initial entry as:

```
135213
131713
249013
005444
051133
010000
``` the following record:

```
105444
062511
051133
010000
000400
``` will be perforated in both the line observing output tape and the detail call tape.

There are many variations of the above-described patterns to take care of many operating contingencies and which need not be described in detail. One of the important circuits of the computer but which in fact gets less use than others is the so-called straddle circuit for taking care of a variety of calls which are incomplete on one tape and which are mainly recorded so that an operator or clerk may investigate the tapes and correlate the data mentally or prepare for billing the charges by hand or otherwise.

In general, the computer consists of a plurality of registers into which both items of specific information and items of general information may be entered, a calculator, steering means, line forming pattern means and distributing means. Specific details of a call are entered, the elapsed time is calculated and this is weighted, rounded off and converted into charges, either chargeable time or a number of message units.

Again, generally the first items of information entered in the computer are the recorder number, the hour and the day, and these are registered before any specific problem is presented for calculation and remain registered until a complete group (for a single call identity index) of calls has been processed. During the processing of this group the hour and the day registrations are changed from time to time by the occurrence of an hour entry found among the scattered items of specific information.

The first of the specific items of information to be registered are the two items fixing the start and end of the customer use of the facilities and from these the calculator derives the elapsed time and transmits this to an elapsed time register where it is held under control of an output control circuit. Generally the elapsed time may be calculated and registered before the initial entry giving other details of the customer use can be completely registered and the output lines formed and transmitted. To save time, an overlapping arrangement is employed, whereby after a calculation has been made and the elapsed time has been transferred to the elapsed time register but before the computer has transmitted the patterned lines to an output tape, the time element lines of the next call are entered in the calculator.

After the complete information has been registered in the computer, the output control will cause the selection of a particular output channel and will transmit thereto the patterned lines such as those explained hereinabove.

The circuits are complex and are characterized by a great many check circuits for insuring accuracy. It is believed that the operation of this processing device can best be seen through a short description of the many novel features incorporated therein.

One of the objects of the invention is to provide safeguard means to prevent the formation of a record used in the process of automatic accounting which might lead to errors and particularly to guarantee that the records about to be formed are in satisfactory mechanical form to properly function in the next processing device in which they will be used.

In its preferred form, the present invention is employed in an automatic accounting system in which charges made against customers for the use of certain facilities are processed through a plurality of steps to the final preparation of customers' bills. As a specific example of an automatic accounting system, a message accounting system for preparing bills to be presented to subscribers for telephone use for the messages transmitted is disclosed at least in part. The process used is to record on a tape items of information regarding the individual messages transmitted by the various subscribers to the system over a given period. This tape is then placed in a processing device known as an assembler in which the items of information for each message are assembled so that the output of the assembler contains a record of a large number of groups of items of information, each said group containing complete information for one message. This device known as the assembler consists essentially of a reader for reading off the various items of information found on the input tape and for then distributing such items of information to the various ones of ten recorders or perforators whereby a sorting on the decimal basis is carried out and ten output tapes are formed. These ten output tapes are then joined to form a single tape to be used as the input tape for the next step in the process.

In the assembler the record is processed twice so that a tens and a units sort may be made since each message may be identified by a two-digit index number.

After the separate items of information for each message are thus assembled the tape formed by physically or mechanically joining the ten output tapes is used as the input tape in a processing device known as the computer. The computer responds to the quality or value of the various items of information and computes various new items of information therefrom. By way of example, where the items of information include a disconnect time and an answer time the computer will calculate the elapsed time and in some cases may translate this into an equivalent number of message units. The computer also consists of a reader and a plurality of recorders or perforators so that again a sorting takes place and a plurality of output tapes may be mechanically joined to form a new tape to be used as the input tape of another processing unit.

The next processing unit to be used is known as a sorter and this takes the various computed items of information and sorts them in accordance with a customer index number, in this case specifically the telephone subscriber's line number. If the telephone subscriber's line number is a four-digit number then four sorts have to be made, in each case the single input tape being converted into ten output tapes which must then be joined mechanically to form a single input tape for the next processing step.

In order to facilitate the mechanical joining of the output tapes it is necessary in the starting of each processing operation to insure that a sufficient number of splice pattern codes are perforated in the leading end of each output tape so that when the leading end of one output tape is mechanically spliced to the trailing end of another, there will be a continuous line of perforated codes in the single tape thus formed which will allow the tape to pass through the reader of the next processing device.

The present invention consists of a means for insuring or guaranteeing that a sufficient number of splice pattern codes have been perforated in the leading end of every one of the plurality of tapes formed by one of these processing devices. Each such device is, therefore, equipped first, with a means for starting the motors of the various devices such as the reader and the perforators, second, with a means for causing the tape ends to be perforated, and third, with a start means for starting the functional operation of the device. The invention consists of means for preventing the functional start key from becoming effective until after the motors have been started and until after the tape ends have been perforated. It will be understood that if it were possible to start the functional operation of a device before the tape ends were perforated with the splice pattern that in the mechanical joining of the output tapes some of the information would become mutilated and, therefore, certain subscriber charges would be garbled or recorded erroneously.

The effective operation of the functional start means, therefore, is made dependent upon the successful and complete operation of the perforators of each processing unit. The disclosure in the present application is of the circuits employed in the processing device known as the computer. In this device there may be as many as nineteen perforators. Since the output of the computer not only classifies the various messages computed but may also sort them on a digital or some other basis, here, as in other devices of the accounting system, there is what is known as a spreading operation by which is meant that a particular item of information destined to be placed on each of the output tapes is caused to be sequentially perforated in each of such tapes. The splice pattern code, for instance, is one which must be placed on each of the output tapes and hence the spreading operation must take place and this is automatic in that when it has once been started no other operation of the device can disturb or hinder the completion of this spreading operation.

Specifically, means is provided herein for insuring that a minimum number of splice patterns is perforated in each output tape. Means are, therefore, provided for making a minimum of three spreads of nine splice patterns in each tape, that is for instance, the first perforator in line will be operated to perforate the splice pattern code nine times in its tape and then the second perforator in line will be automatically operated in the same manner and so on until each of the perforators to be used has automatically perforated this splice pattern nine times in its tape and this spreading operation will be automatically carried through three times to insure a minimum of twenty-seven splice pattern codes on each output tape end. If the means for starting this automatic operation (the PTE, perforate tape end key) has been restored, then at the end of this spreading operation the functional start key may become effective, so that when the start key has been operated, it will immediately start the functional operation of the device.

A feature of the invention, therefore, is the combination of a record scanner, a plurality of devices for producing records, a manual means for starting an automatic operation for preparing each of the said plurality of devices, a manual start means for functional operation, and means under control of said first manual means for rendering said second-named manual start means effective to produce records.

Another feature of the invention is the use of start relay means to place the device into functional operation, said start relay means being placed under control of and made responsive to the start key only as a result of the restoration of the perforate tape end key and the completion thereafter of a given plurality of spreading operations.

A feature of the invention is a selective circuit popularly known as a funnel circuit for controlling the employment of particular recorders of a plurality of available recorders as hereinbefore set forth. The computer is provided with a single reader and a plurality of recorders each for preparing a separate outgoing tape. For the purpose of preparing toll or detailed tapes, there are as many as six recorders provided so that sorting by days may be accomplished, it being contemplated that no incoming tape will be for a "round" of greater than six days. Where the billing period is divided into six rounds per month, there are generally five days per round but on the last round of a month in which there are thirty-one days, such a round has six days. Now, the traffic may be so heavy that the tape will be severed each day and hence only a single day's business will be processed at a time. In that case, by way of example, if the tape containing the records for the twelfth of the month is being processed, the dials will be set as follows:

| | |
|---|---|
| Round | 2 |
| First day of round | 2 |
| Last day of round | 2 |

For reference purposes the days of a round may be tabulated as follows:

| Days of Round | 1 | 2 | 3 | 4 | 5 | 6 |
|---|---|---|---|---|---|---|
| Round | Calendar Days | | | | | |
| 0 | 1 | 2 | 3 | 4 | 5 | |
| 1 | 6 | 7 | 8 | 9 | 10 | |
| 2 | 11 | 12 | 13 | 14 | 15 | |
| 3 | 16 | 17 | 18 | 19 | 20 | |
| 4 | 21 | 22 | 23 | 24 | 25 | |
| 5 | 26 | 27 | 28 | 29 | 30 | 31 |

As another example, even in a busy office the week-end business might be small so that a tape will be cut to include the business for Friday, Saturday and Sunday (assuming the first day of the month to have been a Sunday) in which case the dials may be set as follows:

| | |
|---|---|
| Round | 1 |
| First day of round | 1 |
| Last day of round | 3 |

In the first example above, only the No. 2 perforator would be used and in the second case the Nos. 1, 2 and 3 perforators would be used.

It is, therefore, unnecessary to prepare the leading and the trailing ends of the tapes in the recorders which will not be used and hence this funnel circuit will respond to enable only the perforators which are expected to be used.

In addition to this it will be realized that the tape is generally severed at 3:00 a. m. so that in the first case there may be a few calls which will be for the third day of the third round. Since these will be very few in number they will be automatically routed not to the No. 3 perforator but rather to the No. 2 perforator. In the second example there may be a few scattered calls for the fourth day of the second round but these will be automatically funneled to the third day of the round.

By the same token in the first example, if by any chance the incoming tape in the reader should report a call for the first day of the round, it will be funneled to the second perforator because the No. 1 perforator has not been enabled.

A feature of the invention may, therefore, be stated to be a selective circuit for automatically routing information identified as belonging in an output tape whose perforator has not been enabled to the nearest numbered output tape whose perforator has been enabled.

Another feature of the invention is the use of a progress or walking circuit for controlling the sequential employment of the various perforators. In this progress circuit there is a single relay permanently associated with each perforator and which controls the enablement thereof. When an item of information is being "spread" on all the output tapes these relays of the walking circuit will be sequentially operated to sequentially enable each of the perforators. However, it frequently occurs that for a given input tape not all of the perforators will be assigned for use as hereinbefore set forth so that when a progress circuit relay operates corresponding to a perforator which is not to be used then the chain must be advanced immediately. A feature of the invention then is a means common to the relays of the chain for advancing the chain and selective means for enabling said relay in substitution for those perforator circuits which remain unassigned for use.

One instance of the use of this advancing means is in the control of the six perforators above mentioned assigned to the possible six days of a round. If, as explained, the second of the perforators available for this service is the only one assigned for use in a given instance, then the chain advancing means will be operated when the chain relays for the Nos. 1, 3, 4, 5 and 6 perforators are operated.

Another feature of the invention is a spread circuit for duplicating items of information on each of the outgoing tapes assigned for service on any given project by sequentially perforating in each said outgoing tapes a predetermined and counted number of said items. A spreading operation is one in which a given item of information is sequentially perforated on each of the outgoing tapes. An example of this may be seen in the tape end preparation, where the end of every outgoing tape which will be used to record the information derived from a given incoming tape must have certain information perforated therein before the device as a whole may be enabled to operate. In each case a plurality of splice pattern codes and the tape identity information must be spread over such outgoing tapes. In some of the devices of the automatic accounting system such items are spread one at a time while in other of the devices a plurality of codes are spread, that is, say nine, splice code patterns are perforated in the first tape, then nine splice code patterns are perforated in the second tape and so on until each outgoing tape has been perforated in like manner. In such a device a line count means is employed for counting the lines perforated on each tape.

A feature of the invention may, therefore, be stated to be the combination of a line counting means and a progress circuit for sequentially connecting the various outlet perforators to the circuit whereby a block (a counted number of lines) may be spread on the outgoing tapes.

In the spread control means, the spreading operation may be started by the temporary operation of a manual key and once having been started will continue automatically until completed. If during the operation the said key is restored, then at the end of the operation the automatic operation will come to a stop. If, however, the key has not been restored, then a new spreading operation will be started.

As an extension of the feature above described, an additional counting means is provided to count a predetermined number of blocks spread on the outgoing tapes, so that a complete spreading operation will comprise the sequential application of a block of given codes on each of the outgoing tapes a given number of times. In one application of this principle a block of nine splice pattern codes is spread on the outgoing tapes and this is repeated three times so that one spreading operation results in placing twenty-seven splice pattern codes on each tape. If the tape end key has not been restored before this operation has been completed, then the operation will be repeated so that the tape end preparation will result in the perforation of twenty-seven splice pattern codes or any greater multiple of nine lines.

Another feature of the invention may, therefore, be stated to be the combination of a sequence or progress circuit for sequentially connecting each of the outgoing tape perforators to the circuit, a counting means for counting the number of lines perforated in an outgoing tape on each such connection and another counting means for counting a predetermined number of complete operations of said sequence circuit.

The drawings consist of eighteen sheets having twenty-two figures as follows:

Fig. 2 is a highly schematic showing of the basic switching circuit employed herein;

Fig. 3 is a block diagram showing how Figs. 4 to 13, inclusive, may be placed to form a more detailed but yet a schematic-like use of the elements of the present invention and in which:

Fig. 4 shows the reader and the reading relays by which the input tape is scanned;

Figure 5:
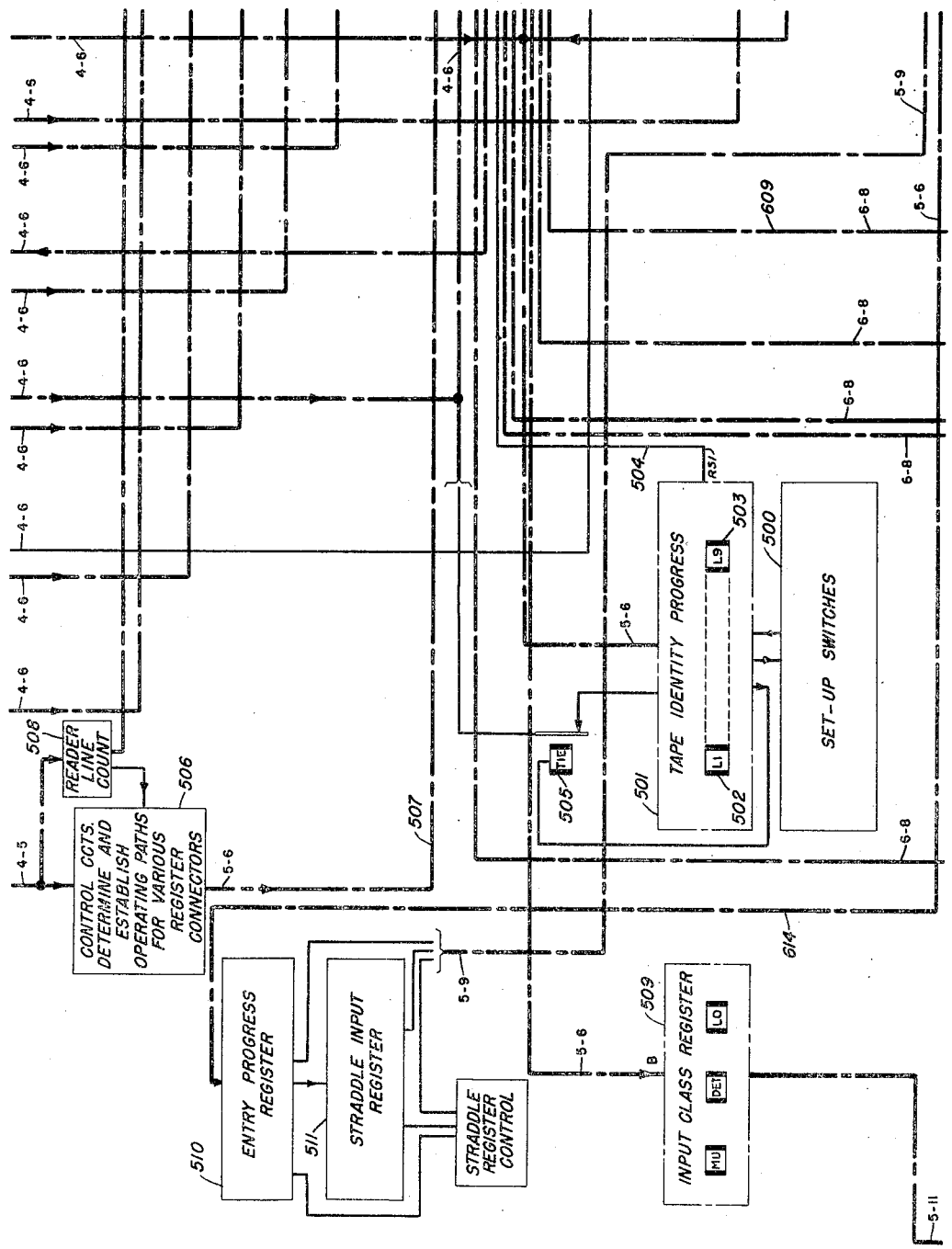
Figure 6:
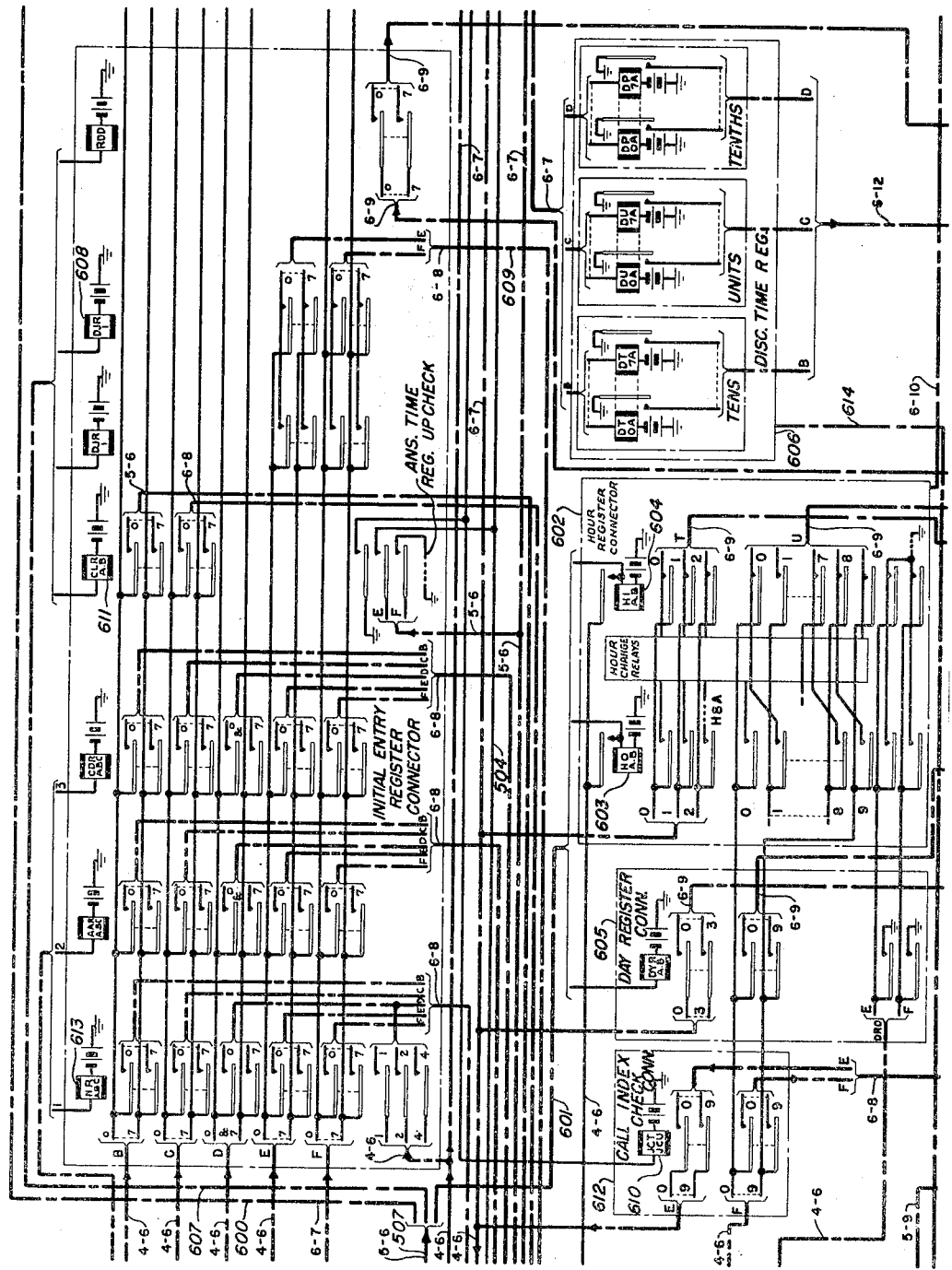
Figure 7:
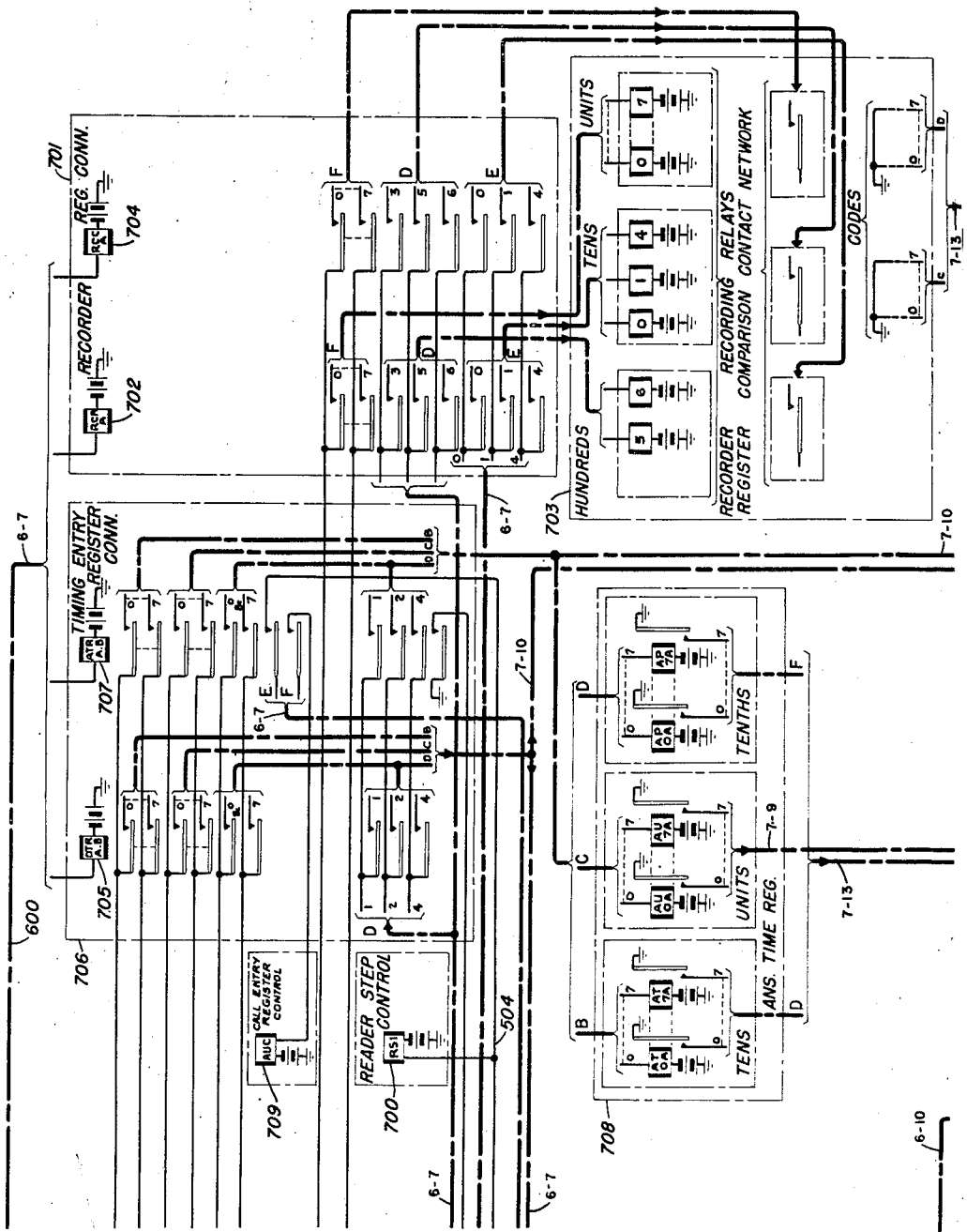
Figure 8:
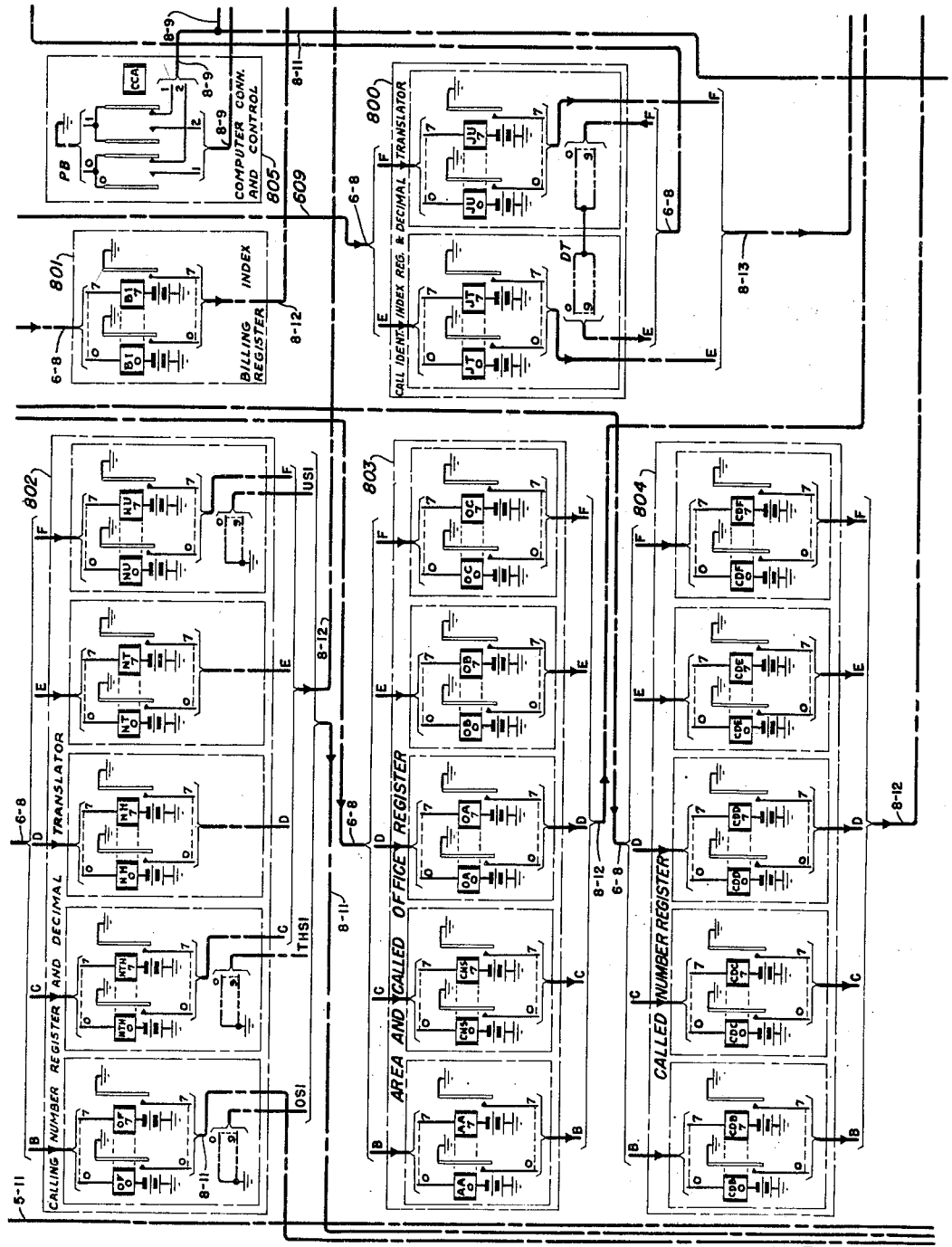
Figure 9:
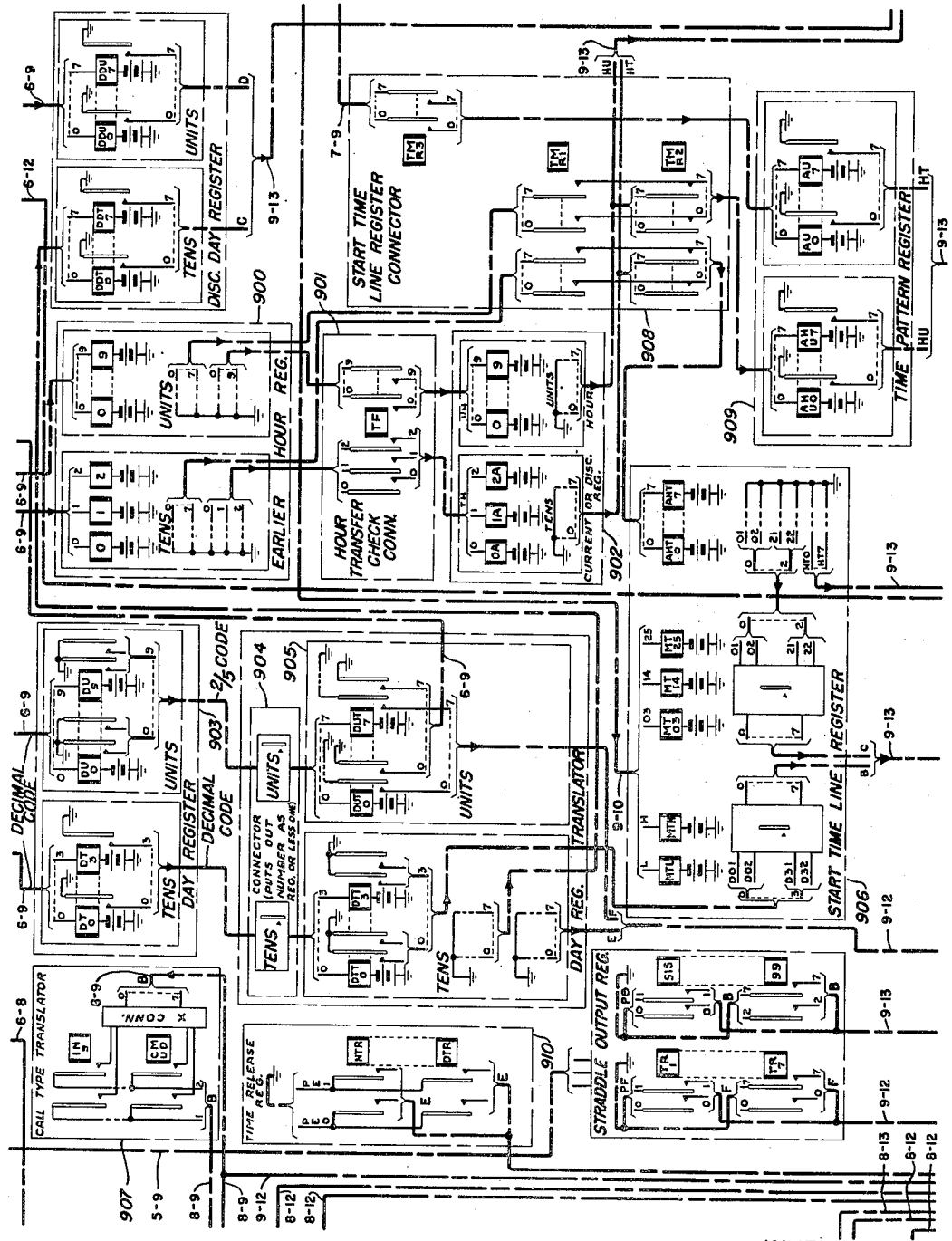
Figure 10:
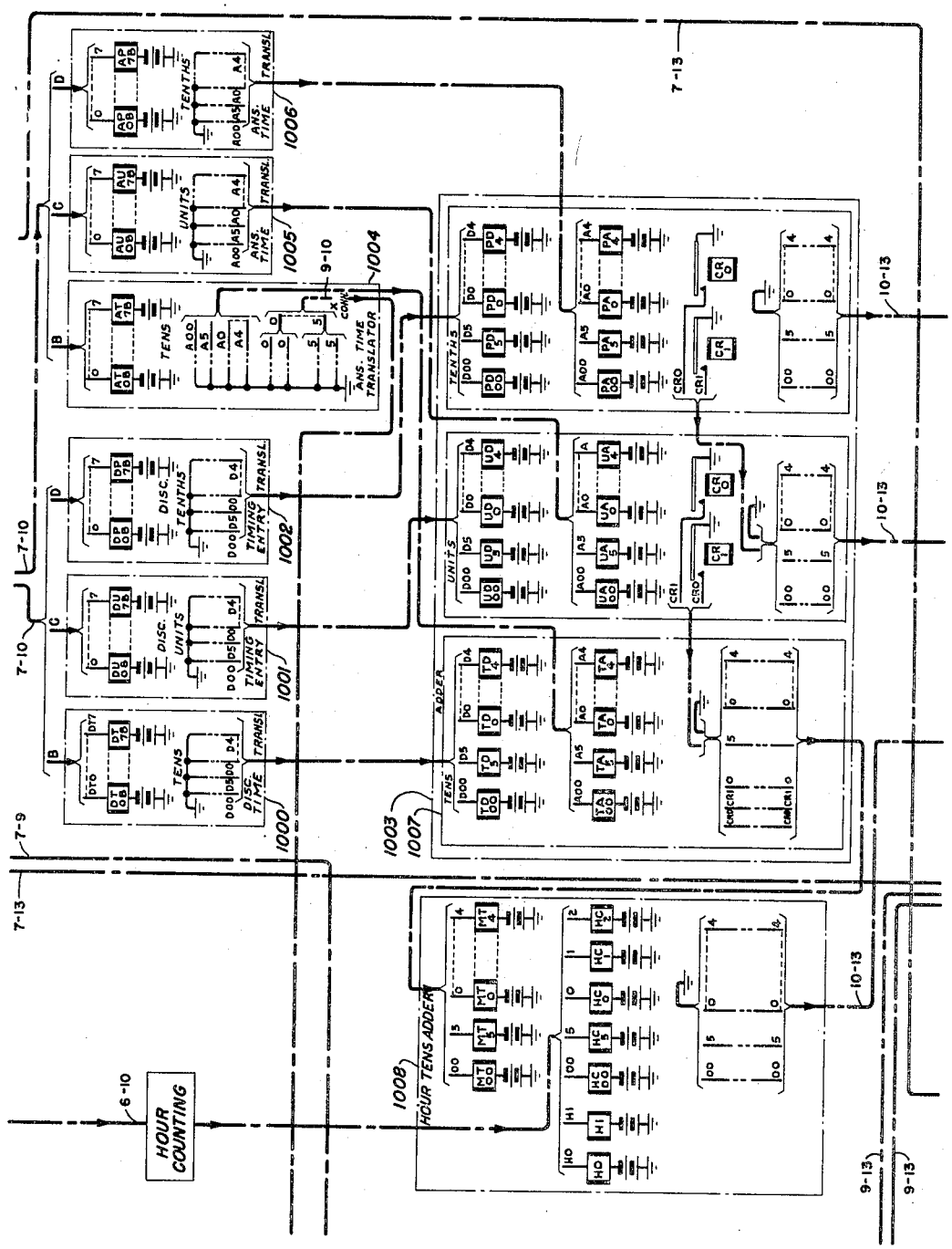
Figure 11:
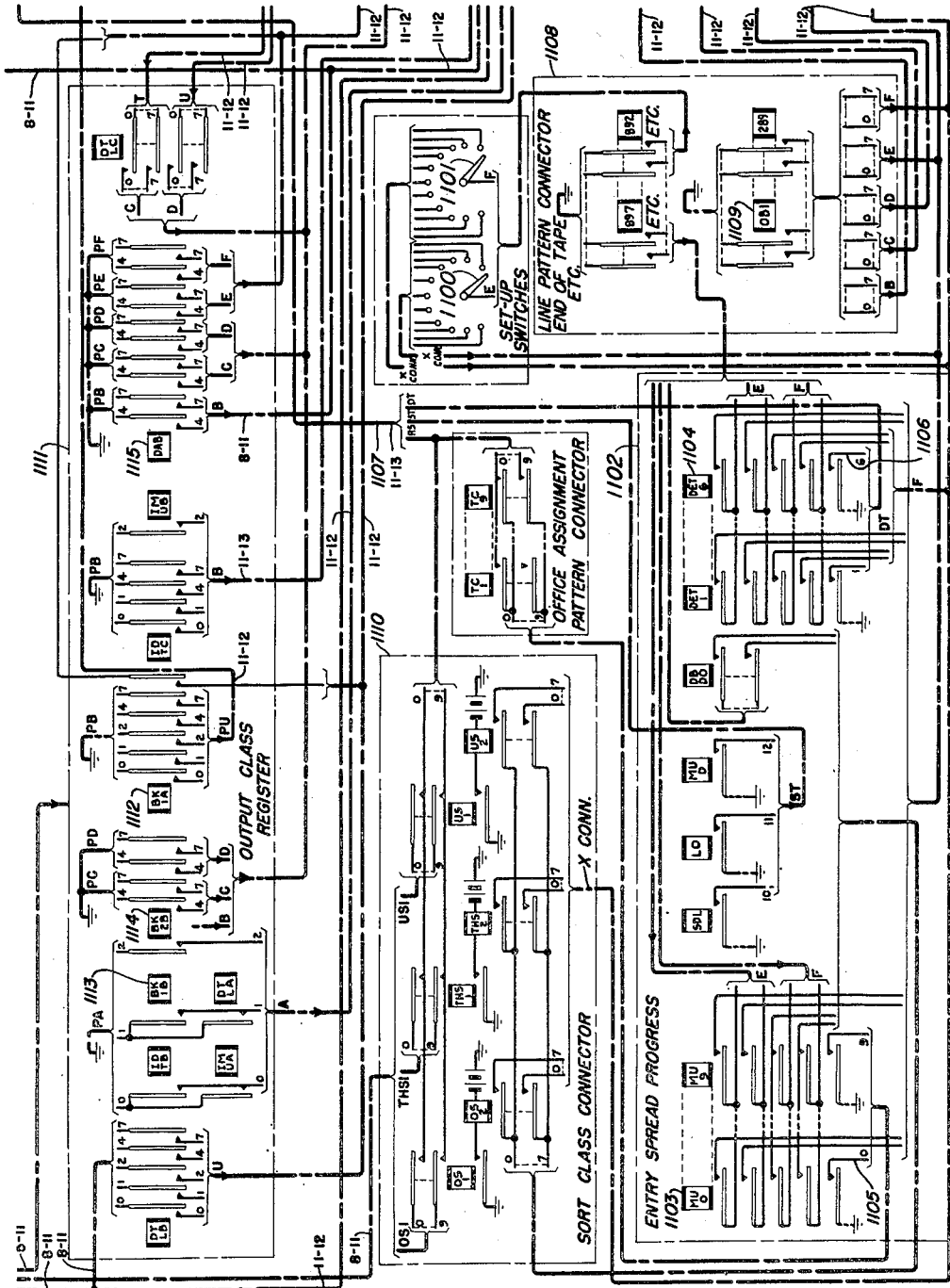
Figure 12:
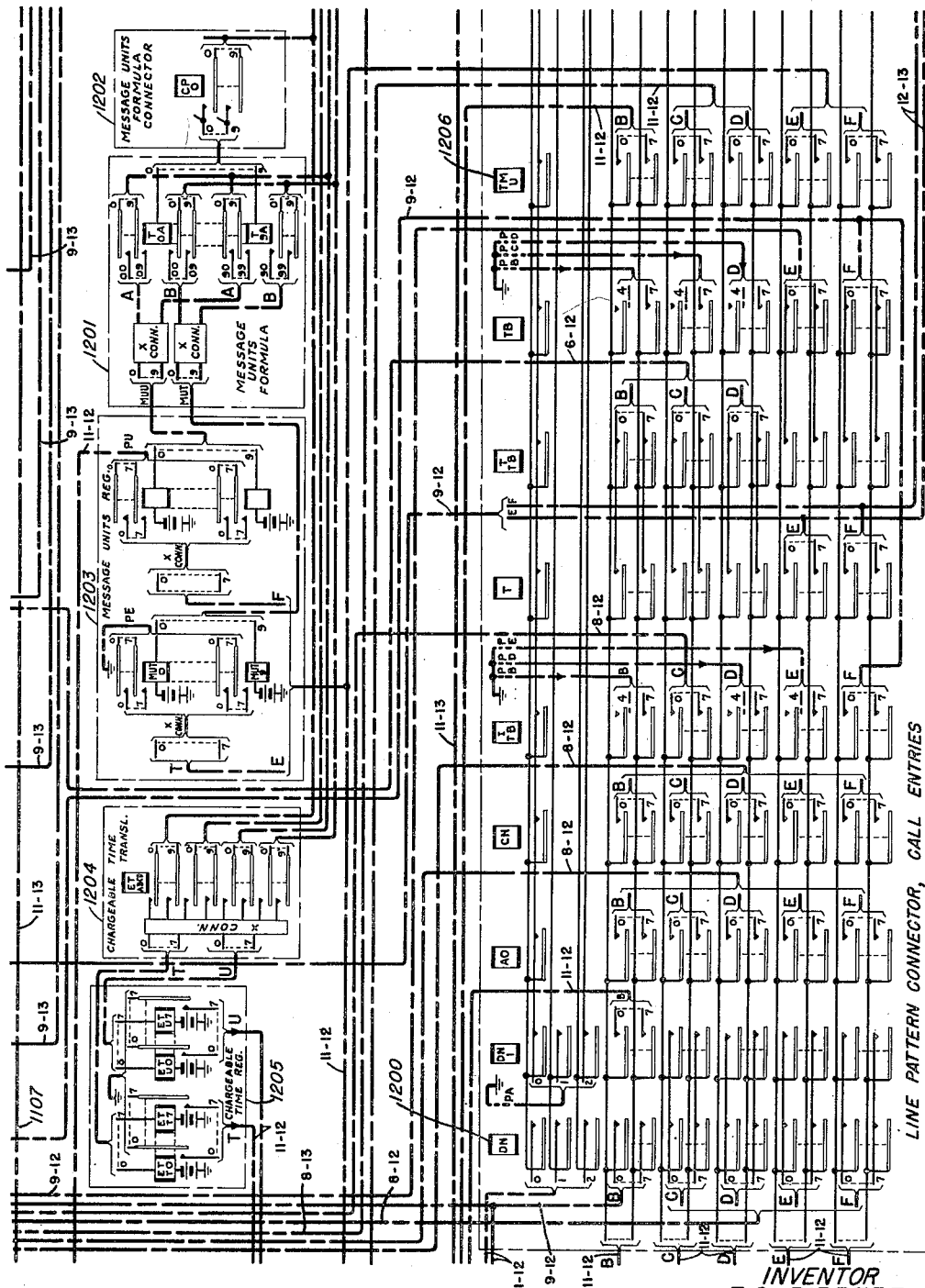
Figure 13:
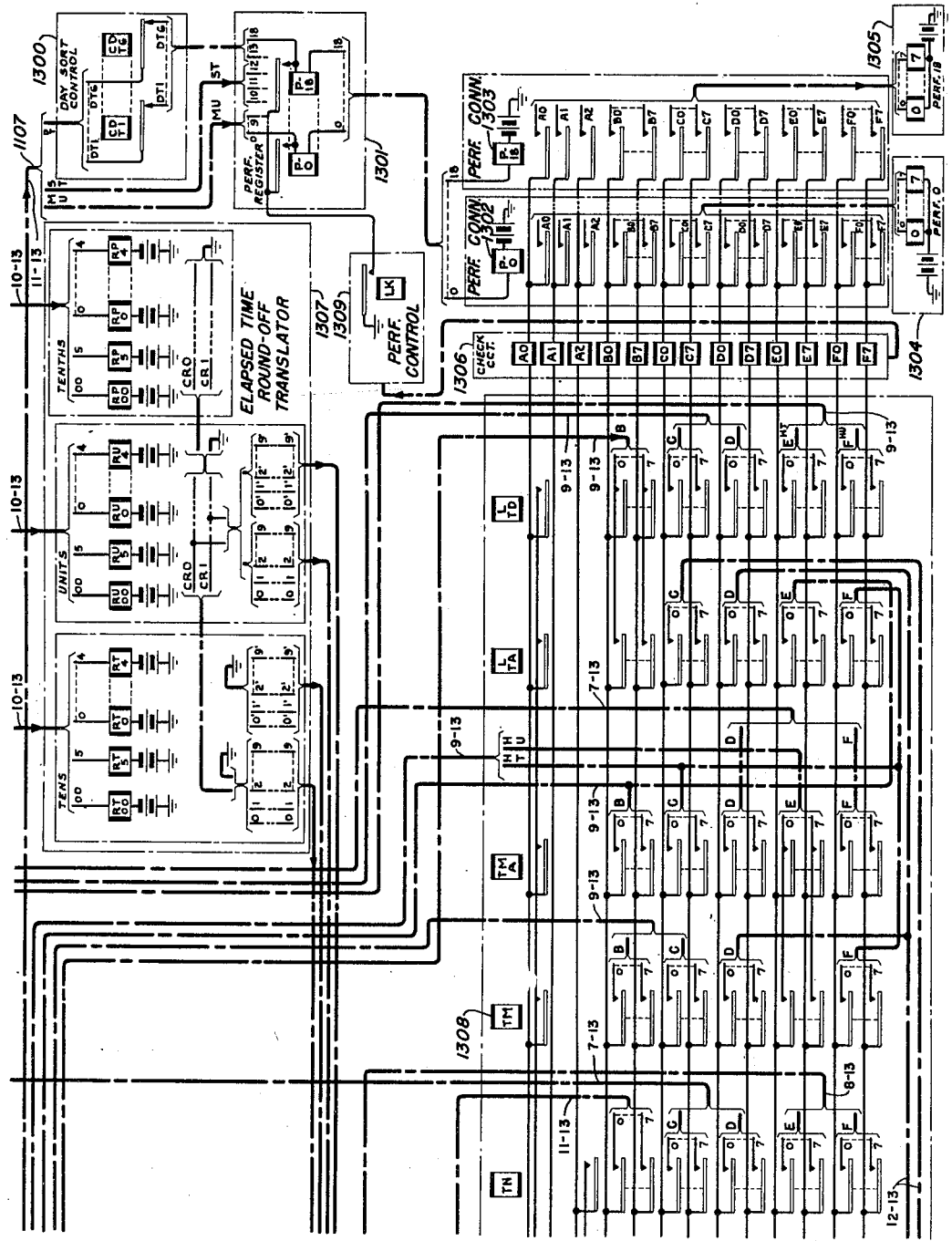
Figure 19:
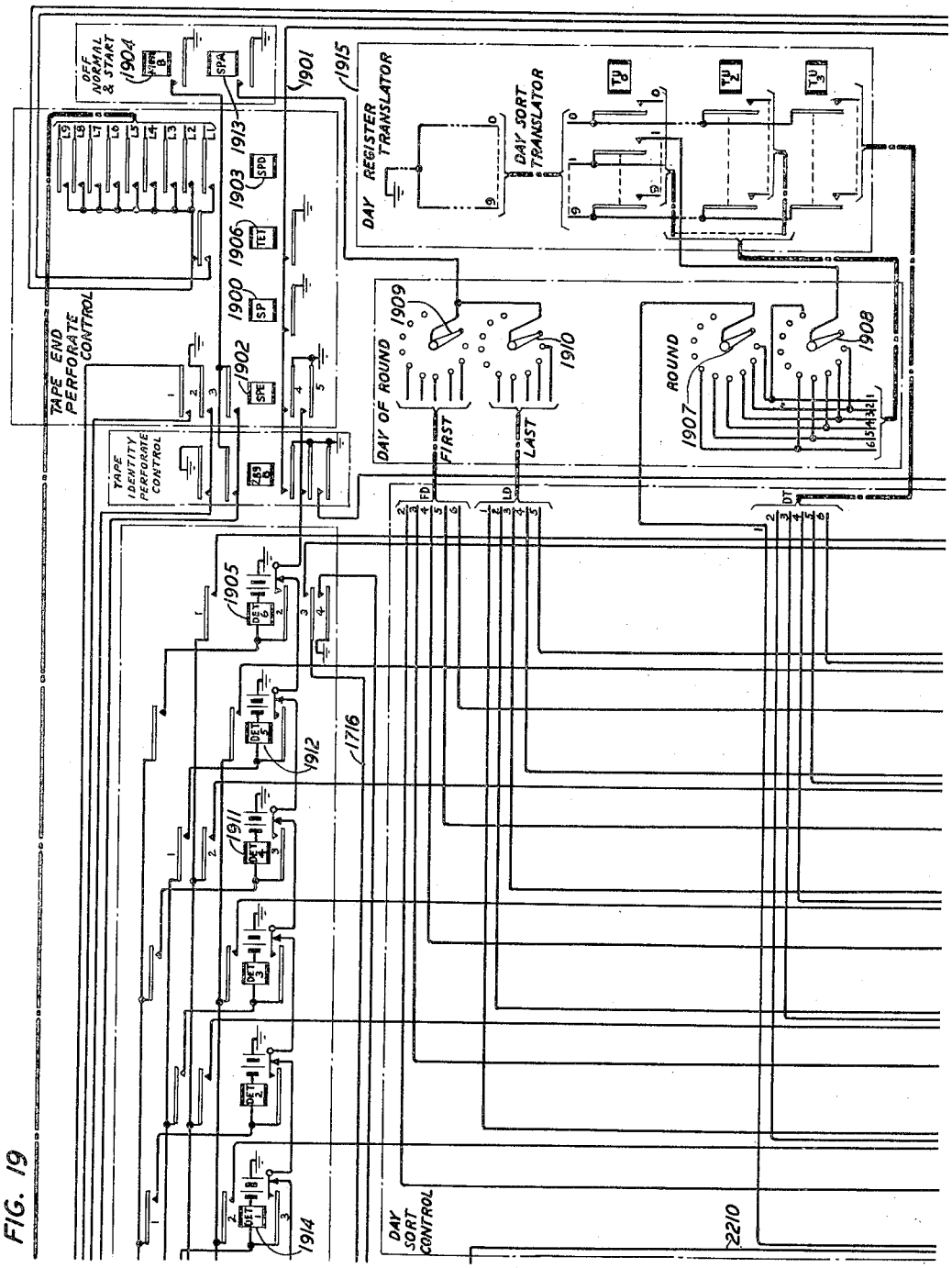
Figure 21:
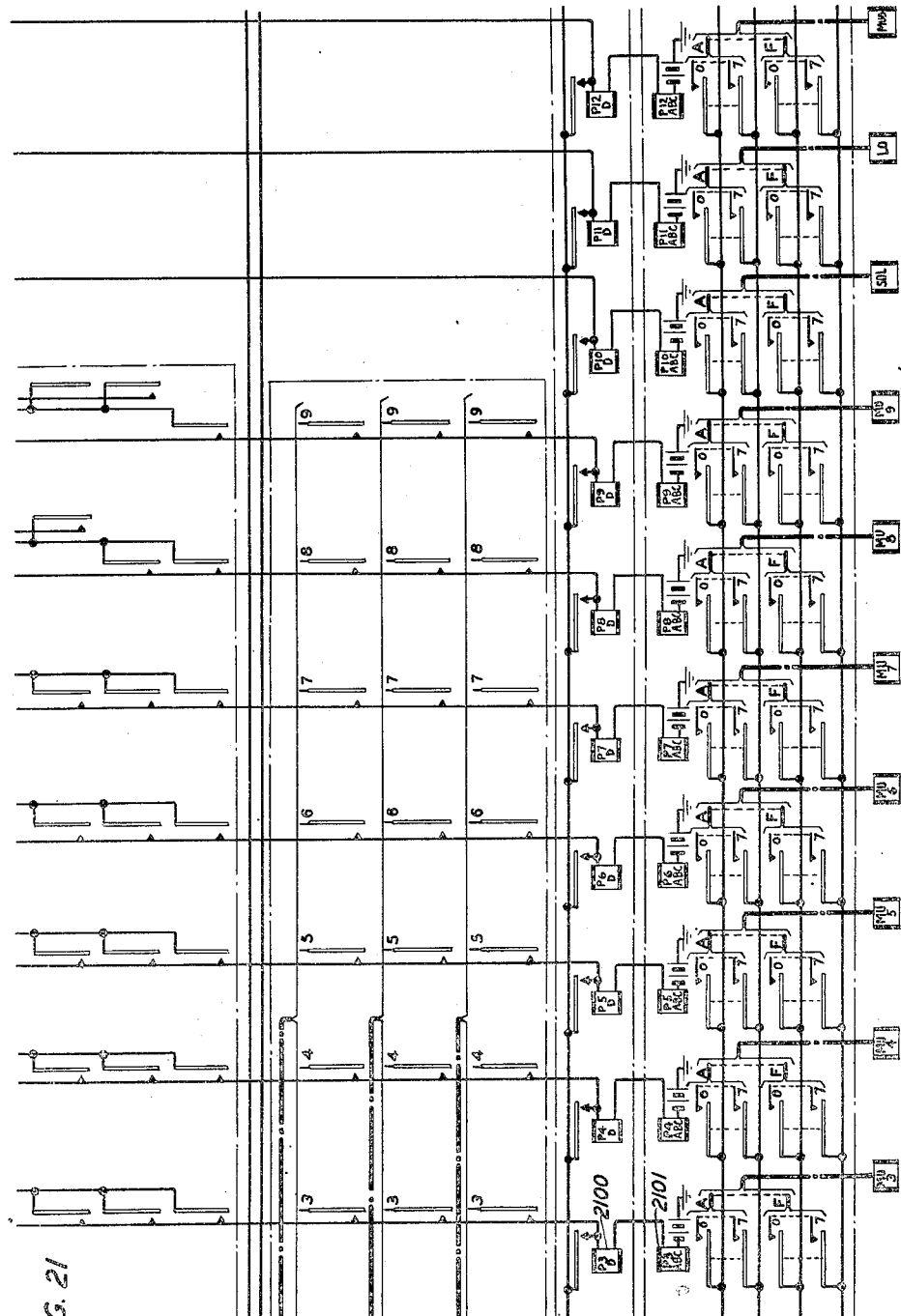
Figure 22:
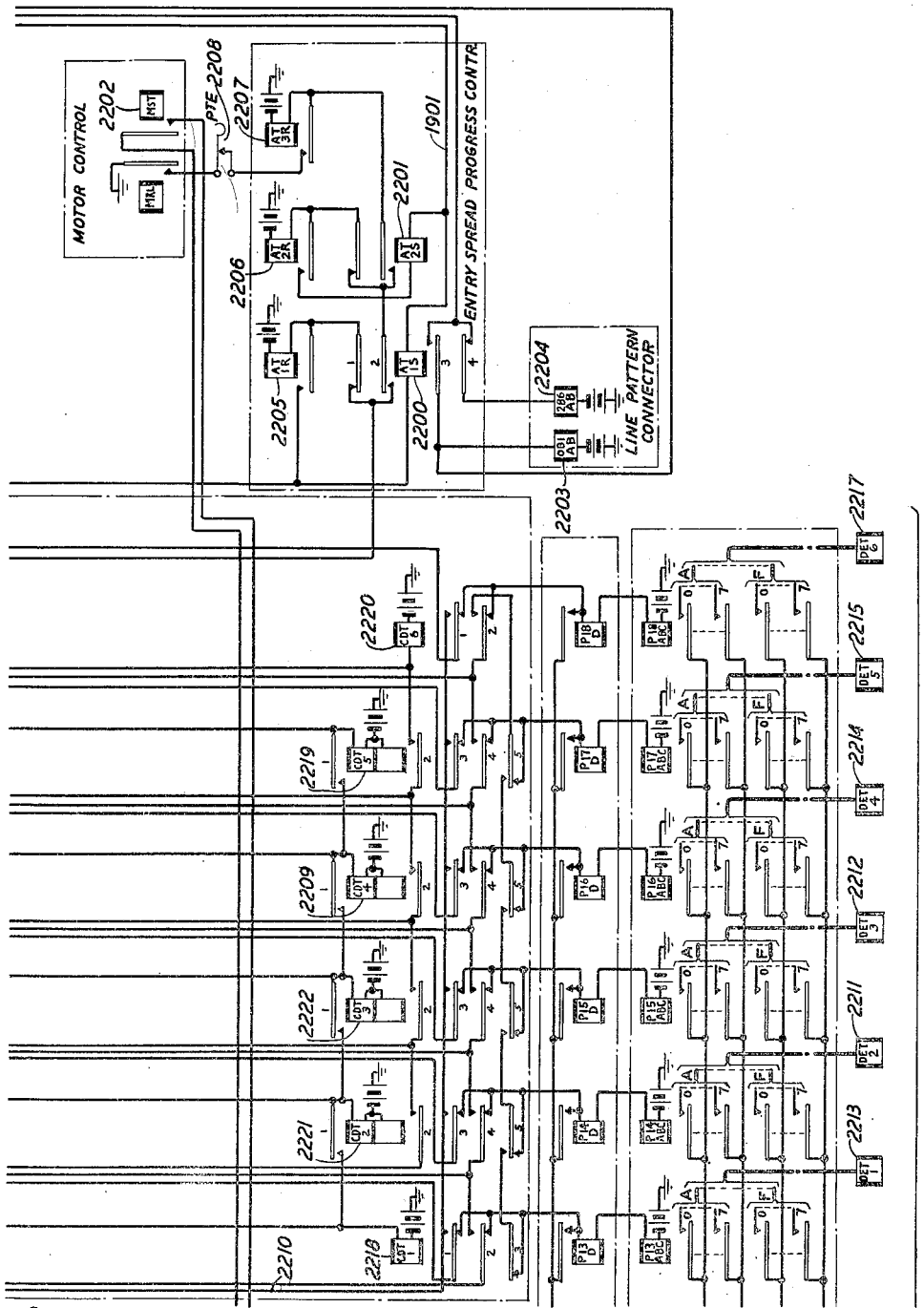

Fig. 5 indicates the location in the circuit arrangement of the reader line count means, the reading relay translator and the control circuits;

Fig. 6 shows a number of register connectors and indicates the disconnect time register;

Fig. 7 likewise shows a number of register connectors and indicates the answer time and the recorder register;

Fig. 8 shows the calling number register, the area and called office register, the called number register, the billing index register and the day and junctor register and decimal translator;

Fig. 9 shows the call type translator, the day register, the time release register, the day register translator, the straddle output register, the start time line register, the earlier hour register, the hour transfer check connector, the disconnect register, the disconnect day register, the start time line register connector and the time pattern register;

Fig. 10 shows the adder, that part of the computer which performs the mathematical functions thereof;

Fig. 11 shows the output class register, the sort class connector, the entry spread progress circuit, the office assignment pattern connector, the set-up switches and the line pattern connector for the end of tape perforation;

Fig. 12 shows the chargeable time register, the chargeable time translator, the message units register, the message units formula device, the message units formula connector and the line pattern connector for call entries; and Fig. 13 shows the elapsed time translator, the day sort control, the perforator register, the perforator control, part of the line pattern connector for call entries, the check circuit therefor and indicates two of a plurality of perforator connectors and the associated perforators;

Fig. 14 is a schematic circuit diagram showing the essential parts of the circuit for insuring that the tape ends of the outgoing tapes are properly prepared before the machine is placed in functional operation;

Fig. 15 is a block diagram showing how Figs. 16 to 22, inclusive, may be placed to form a complete schematic circuit diagram illustrating particular features of the invention and in which:

Fig. 16 shows the perforator line count circuit;

Fig. 17 shows part of the entry spread progress control circuit, the reperforator control circuit and a portion of the entry spread progress circuit;

Figure 18:
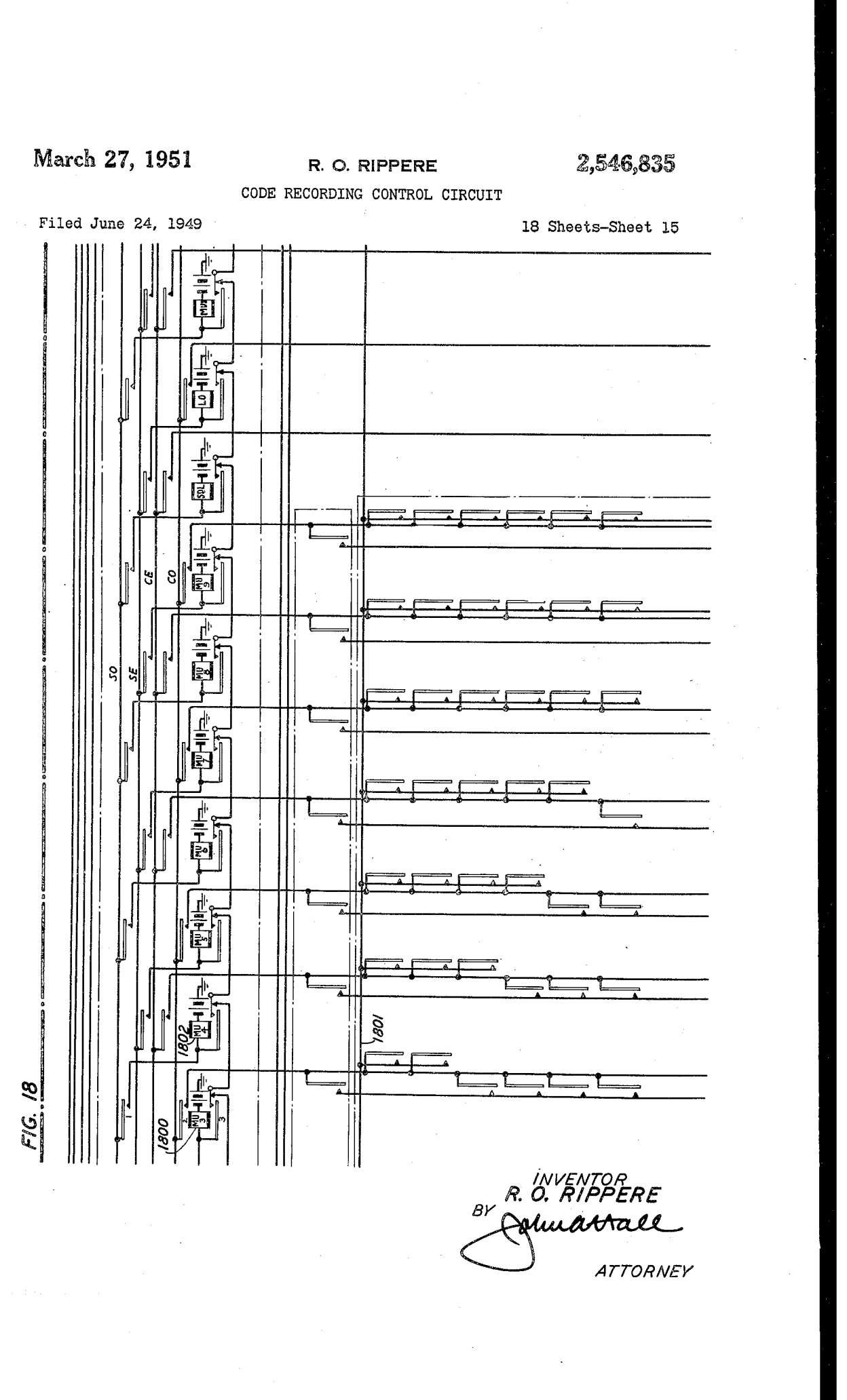

Fig. 18 shows another portion of the entry spread progress circuit;

Fig. 19 shows still more of the entry spread progress circuit together with the tape end perforate control circuit, the off-normal and start circuit, the day register translator and an indication of the set-up switches;

Fig. 20 has an indication of the calling number register and portions of the entry spread progress circuit, the perforator register circuit and the perforator connector circuit, as well as indications of certain of the perforators;

Fig. 21 shows a portion of the entry spread progress circuit, the perforator register, the perforator connector and indications of certain of the perforators; and Fig. 22 shows the remaining portions of the entry spread progress circuit, the perforator register, the perforator connector and certain of the perforators, as well as the day sort control, the motor control, the line pattern connector and a portion of the entry spread progress control circuit.

In the following description the various relays are designated by both letters and numerals which have come to have certain significance to persons familiar with the technical details of the disclosed arrangements. By way of example, the reading relays are known as the A0, A1 and A2 relays for the first group thereof used to register the A digit of the six-digit line used in the automatic accounting system tapes. In the present case, there are three relays in the first or A set and five relays such as the B0, B1, B2, B4 and B7 relays in each of the remaining five sets. In a great many cases a relay will have only such an alphabetic designation but in other cases it will have in addition a numerical designation which always consists of the figure number plus two other digits, whereby the location of a piece of apparatus can be at once found by turning to the corresponding figure number. Where conductors are designated by numerals in addition to the usual alphabetic designation thereof the number used will be a combination including the figure number wherein the conductor is first picked up in the tracing of a circuit and this number will be retained even though the conductors extend through another large number of circuits. Another convention used herein for the sake of clarity is a numbering scheme for the cables or bundles of conductors which must be carried over long distances. This is the use of a hyphenated number such as 29–118 indicating that this cable or bundle of conductors extends between Fig. 29 and Fig. 118.

For obvious purposes, in certain cases, conductors will bear the same alphabetic designation as other apparatus. This is not to be taken as a duplication of the designation but will be readily understood that such a conductor bears an intimate relation to the other piece of apparatus.

Similar logical means for designating various elements of the circuits will be found in the drawings and are used as an aid to the clear understanding of the present arrangement.

The apparatus used in constructing the device of the present invention is mostly standard communication apparatus, details of which may be found in the following references:

The relays are of types shown in patents:

| | | |
|---|---|---|
| 1,156,671, | E. B. Craft | Oct. 12, 1915 |
| 1,633,576, | C. H. Franks | June 28, 1927 |
| 1,652,489, | E. D. Mead | Dec. 13, 1927 |
| 1,652,490, | D. D. Miller | Dec. 13, 1927 |
| 1,652,491, | D. D. Miller | Dec. 13, 1927 |
| 2,169,551, | C. I. Baker | Aug. 15, 1939 |
| 2,178,656, | P. W. Swenson | Nov. 7, 1939 |
| 2,323,961, | F. A. Zupa | July 13, 1943 |

The reader is disclosed in application Serial No. 666,280, May 1, 1946, W. W. Carpenter.

Other apparatus is of conventional design.

This application is one of a group of applications all disclosing features of the same device. The Joel application contains a full and complete description of all the circuit details, as well as a short description of several of the features thereof, while the remaining applications, including the present, of this group each contain short descriptions of several other features of the device and each relies upon the said Joel application for the full and complete description of the circuit details of the device as a whole. The complete disclosure of the device of the present invention will, therefore, be found in the present and the following applications:

| Serial No. | Filing Date | Inventor |
|---|---|---|
| 101,087 | June 24, 1949 | A. E. Joel, Jr. |
| 101,088 | June 24, 1949 | Joel-Rippere. |
| 101,084 | June 24, 1949 | Flint-Hague-Joel-Rippere. |
| 101,085 | June 24, 1949 | Flint-Joel. |
| 101,089 | June 24, 1949 | A. E. Hague. |
| 101,083 | June 24, 1949 | E. W. Flint. |
| 101,082 | June 24, 1949 | Eppel-Joel. |
| 101,090 | June 24, 1949 | Hague-Joel. |

Other applications covering parts of the same development having disclosures overlapping the present disclosure in certain respects but covering independent inventions, as claimed therein, are as follows:

| Serial No. | Filing Date | Inventor | Patent No. | Issued |
|---|---|---|---|---|
| 101,081 | June 24, 1949 | S. L. Eppel | | |
| 38,927 | July 15, 1948 | J. W. Gooderham | | |
| 788,449 | Nov. 28, 1947 | W. W. Carpenter | 2,496,150 | Jan. 31, 1950 |

Other applications having some relation to the present disclosure in that such applications show details of the complete development of which the present is but a part are as follows:

| Serial No. | Filing Date | Inventor |
|---|---|---|
| 724,992 | Jan. 29, 1947 | Carpenter-Gooderham. |
| 759,402 | July 7, 1947 | Carpenter-Collis. |
| 793,208 | Dec. 22, 1947 | Joel-King. |

It may be noted that the Joel-King application above discloses the over-all plan of the automatic accounting system of which the present application is a part.

*General appearance*

Figure 1:
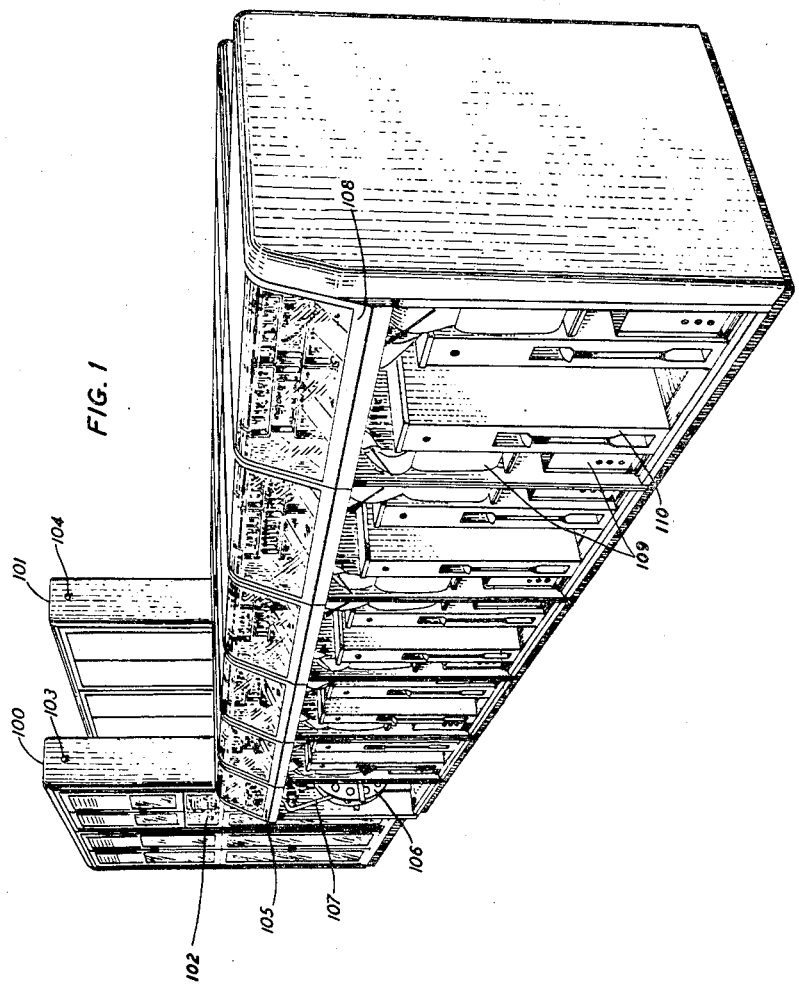
Fig. 1 is a perspective view of the racks and cabinets in which the device of the present invention is housed and is intended to give a general view of the device.

The general appearance of one embodiment of the invention is given in the perspective view in Fig. 1. There are two cabinets 100 and 101 in which the relays and other small apparatus are mounted. The key and lamp panel are indicated at 102 and contain the set-up switches, the various lamps and the keys used in investigating the condition of the computer at any time, particularly after an alarm has been brought in. Two main alarm lamps 103 and 104 are indicated as being mounted near the top of the relay cabinets and are in such a position that they can be seen from any part of the large room in which this piece of apparatus is mounted along with similar appearing apparatus for the assembler, the sorter, the summarizer and the printer. Shown in this view, there are six cabinets of which the first one 105 houses the reader. A reel 106 below the reader holds a long length of tape such as 107 which feeds into the reader above and after being processed is returned to and wound on another reel. Each of the other cabinets such as the right-hand end one 108 houses a pair of perforators. In each of these cabinets there is mounted a bin such as 109 containing a long length of unperforated tape which after being processed by the perforator is fed into another bin 110. The computer may contain as many as nineteen perforators as will be explained hereinafter and each customer charge as it is computed is sorted by being selectively perforated on one or another of the various output tapes.

*General operation*

Fig. 2 is what might be termed a thumb nail sketch to explain the organization of the device forming the subject-matter of the present invention. It consists of a reader 200 for reading the perforations on an incoming tape representing items of information comprising the gathered and assembled data for customer or subscriber charges. As the various codes are sensed by the reader they are then distributed by means of the register connectors 201 to registers 202. The registers here represent a temporary holding means for the information, part of which is used for calculating purposes or for internal rearrangement and is reregistered and part of which is retained in its original form before being routed to output tapes. At any rate a selecting means, here shown as the line pattern connector 203 is employed to glean from the registers selected bits and items of information and then through another distributing arrangement, the perforator connector 204 to route the computed charge data to the various perforators 205 whereby a plurality of output tapes are formed.

There are two communication channels, or trunks, one to transmit the incoming data from the reader to the registers and the other to transmit the outgoing data from the registers to the tape perforators. The registers form the heart of the device, for it is within this arrangement that the information is processed and held ready for the output circuit to make its selection and its records.

This Fig. 2 will then be regarded as a backbone or skeleton for the more elaborate schematic shown in Figs. 4 to 13, here arranged as shown in Fig. 3.

In this general schematic of the system, the input or reading means is shown in Fig. 4. This consists of a reader 400, a device essentially for the sensing of the twenty-eight code perforations in the automatic accounting system tape, incoming to this unit of the system and which had been produced as an output tape by the assembler. The reader consists of an assemblage of twenty-eight pins which seek to pierce the holes perforated in corresponding positions of the tape, those which succeed, signaling the achievement by connecting ground to a corresponding conductor and those whose path is blocked by unperforated tape holding their corresponding conductors open.

The twenty-eight conductors connected to the twenty-eight reader pins pass through the contacts of the reader connector 401 by means of which they may be connected as determined by the control circuits to the reading relays. In the case of the first three of these conductors representing the code for the first or A digit, an additional break is placed in the path of these conductors consisting of the make contacts of the ST3 start relay 402 in the off-normal and start circuit 403 so that the A digit codes cannot operate the A digit reading relays until the device has been properly started and is in satisfactory operation.

The coded grounds are thus extended to and operate the reading relays during the reading interval and so far as the registers into which the codes are read merely act to relay the ground signals from the reader. However, the reader closes but a single path whereas each reading relay controls a plurality of contact sets whereby the validity of a code may be tested and various other control circuits may be closed whereby the item of information contained in a code being read by the reader not only may be forwarded to a register but a part of the code may be used for control and other operations.

As clearly indicated in Fig. 4, the twenty-eight places of the code are alloted three for the first or A digit and five for each of the following five B, C, D, E and F digits. The A digit reading relays 404 consist of the A0, A1 and A2 relays and are used to index the line read and to thus classify the information contained in the other five digits.

By way of example, a zero in the A digit, signaled by the operation of the A0 relay, may be a splice code or a supplementary line of an initial entry, a 1 in the A digit, is a timing entry such as the disconnect or the answer time, the 2 in the A digit may be the first line of an initial entry, one of the tape identity codes or some special code and lastly a 3, signaled by the simultaneous operation of all three A0, A1 and A2 relays may be a special code such as a timed release at the disconnect time.

Each of the remaining five digit groups of reading relays such as the B digit group 405 have five relays designated 0, 1, 2, 4 and 7 and are known as a two-out-of-five group, since the code to express any one of the ten digits consists of the energization of two out of the five available relays in such a combination that the sum of their designations equals the digit expressed. An exception to this general rule is that the operation of the 4 and the 7 relays expresses the digit 0.

The splice code 081010 is then expressed by the operation of the A0 relay in the A digit group 404, the B1 and B7 relays in the B digit group 405, the C0 and C1 relays in the C digit group 406, the D4 and D7 relays in the D digit group 407, the E0 and E1 relays in the E digit group 408 and the F4 and F7 relays in the F digit group 409. Other codes are expressed in like manner.

The tape identity codes are those which have the same first three digits 289 and count from 2891XX to 2899XX so that in this case the 289 is used for certain control purposes, the 1 to 9 in the D digit for counting purposes and generally only the last two, the E and F digits for actual information purposes.

When it comes to the actual information codes, such as the timing entries and the initial entries, then only the A digit is used for indexing purposes and the rest are all used for true information purposes.

Other entries interspersed with the three informational codes above, such as the hour entries contain actual information in only the last two or three digits and identification of the entry in the others or at least in the first four or three thereof.

The computer is prepared for operation by adjusting a plurality of set-up switches to express information concerning a tape to be processed. Such switches are here represented by the E and F set-up switches 1100 and 1101, respectively, and by means of such switches the following information may be established:

1. Sort of MU calls to be effected
2. Marker group—tens
3. Marker group—units
4. First recorder—tens
5. First recorder—units
6. Last recorder—tens
7. Last recorder—units
8. Day of round—first
9. Day of round—last
10. Month—tens
11. Month—units
12. Round All of this information with the exception of the first will be found in the tape identity codes and these codes must check by automatic circuit operation against the setting of the switches before operation of the device may proceed.

After the set-up switches are adjusted and the incoming tape has been introduced in the reader the tape end key is operated temporarily and then the start key is operated. It is necessary to operate the tape end key first because the ends of all output tapes must be prepared before the computer can go into operation and, therefore, the circuit is so arranged that until the tape end key has been operated and then restored the operation of the start key will be ineffective. Once the tape end key has been operated the operation becomes automatic and twenty-seven or some multiple thereof of the splice code will be perforated in all the output tapes. In accordance with certain arrangements which will be fully explained hereinafter, nine codes are spread over the output tapes and this is repeated three times. If the tape end key is restored before this operation is complete, then the operation will halt after each output tape has had twenty-seven splice codes perforated therein, otherwise the operation will be automatically repeated. Thereafter, the start key will be effective.

In the lower part of Fig. 11 the rectangle 1102 represents the entry spread progress circuit and consists of a sequence arrangement known as a walking circuit, whereby the ten MU perforators are operated in turn followed in order by the perforators for the straddle tape, the line observing tape, the MU detail tape, and the six detail tapes or any selection of these which may be determined by the nature of the incoming tape and recorded on the set-up switches. These various perforators, or rather means to sequentially render them operative to perforate a given code are here represented by the relays such as the MU0 relay 1103 at the left to the DET6 relay 1104 at the left.

The control of this entry spread progress circuit over the perforators is here shown schematically by the conductors such as the 0 conductor 1105 controlled by the MU0 relay 1103 and the 6 conductor 1106 controlled by the DET6 relay 1104 which may be effectively traced over the path 1107 through the day sort control 1300 and the perforator register 1301 to the perforator connector relays such as the P—0 relay 1302 and the P—18 relay 1303. Thus, the perforators such as the PERF.0 designated 1304 and the PERF.18 designated 1305 may be sequentially connected to the trunk for controlling the perforations to be made.

This trunk consisting of twenty-eight conductors extends from the line pattern connector 1108, through Fig. 12 and Fig. 13 to the twenty-eight relays A0 to F7 here shown as the perforator check circuit 1306.

The 081010 splice pattern code is formed in the line pattern connector 1108, employed for the end of tape preparation. In this rectangle, there is indicated the 081 relay 1109 which will extend grounds to the conductors of the perforator code trunk described so that each perforator as it is sequentially connected to this trunk will, as before stated, perforate a series of nine splice pattern codes, to be repeated three times.

It may now be assumed that the tape end key is restored and the start key is operated so that the device will go into operation. The splice code on the end of the incoming tape will be passed through the reader until the tape identity codes are encountered. These are nine codes 2891XX to 2899XX in order. The first of these must have the tape index 02, indicating that the incoming tape is one prepared in a second sort operation by the assembler. In the computer then the first code encountered after the splice pattern is 289102 and no other code will advance the operation of this device to further operations. It may also be noted at this point that no other accounting system device will accept this tape except the printer when set for verbatim printing.

The tape identity codes are then read by the reader, each in turn, and the information they carry is checked against the information expressed by the setting of the switches such as 1100 and 1101, also here generally indicated by the rectangle 500. Each of the codes 2891 to 2899, inclusive, will be expressed by the A, B, C and D digit reading relays and passed to the tape identity progress circuit 501 wherein a series of relays such as L1 relay 502 and L9 relay 503 will respond as each line is checked. As each line proves satisfactory a signal is given over the RS1 lead 504 to operate the RS1 reader step relay 700 to properly advance the tape in the reader to the next code. On the last line the reader step relay is not operated immediately but held until this information can be spread on the output tapes. When the full nine lines of the tape identity codes have been checked, then the IC identification check relay is operated, and this will start the next operation by which the tape identification is spread on the prepared ends of each output tape, the complete nine lines on one tape and corresponding lines then repeated on the next tape under control of the entry spread progress circuit 1102. The TIE, tape identification ended relay 505, operates after all the tape identification codes have been perforated in all tapes.

The specific information for each line of tape identification is derived from the setting of the set-up switches such as 1100 and 1101 under control of the line pattern connector 1108 for the end of tape, such information being transmitted over the output trunk to the perforators such as 1304 and 1305.

The output tape ends having been prepared and a reader step relay having been operated, the first code of the time group having an item of general information is read. This is the recorder number in the form 280XTU where the D digit (X) is used to indicate that the recorder is a regular or an emergency unit and the E and F digits provide the tens and units digits of any recorder number from 00 to 19.

The A digit reading relays are shown here as exercising a control over the control circuits 506 and these in turn over the paths 507 and 600 as controlling the recorder register connector 701. If no recorder number has been registered then the RCRA relay 702 will be operated to register the D, E and F digits being read by the reader in appropriate parts of the recorder register 703. It may be noted at this time that where the recorder number code is encountered again at the beginning of another section of the incoming tape, the RCCA comparing relay 704 will be operated so that the recorder number may be compared with the number previously registered.

The next code is the hour code, 2811TU, and now the control circuits 506 over the path 601 cause the operation of the hour register connector 602 to register in the earlier hour register 900 this hour entry (generally 03). If this is as now assumed the first hour entry, then the H1A—B relay 604 is operated to register the hour as read. It may be noted that each subsequent hour entry, 2810TU, is through the H0A—B relay 603 whereby the value of the hour is reduced by 1 as it is transmitted to the earlier hour register 900.

The hour having been registered in the earlier hour register it is now transferred through the hour transfer check connector 901 to the current or disconnect hour register 902. This being the first hour entry such transfer takes place immediately. Where, under other circumstances there is an existing registration in the disconnect hour register 902, then a check is made to see that the hour registered in the earlier hour register is one less in value than such existing registration and when this is proved the said existing registration is released and that in the earlier hour register 900 is transferred to the disconnect hour register 902.

The third and final item of general information is the calendar day code, in the form 2821TU, where T and U stand for the tens and units digits of the actual calendar day. Again the control circuits 506 over the path 601 operate the day register connector 605, and the registration is made in the day register 903. This is made in the decimal code, there being four tens relays representing the 0, 1, 2 and 3 for the tens digits of the calendar day and a full complement of ten units digits. When this registration is complete the computer is ready to proceed to its main duties.

It may be noted that the central office tape having been passed through the assembler twice, once on a units digit sort and once on a tens digit sort there may be as many as one-hundred sections in the 289102 tape coming to the computer. These time group entries will follow the splice code in every case and, therefore, the processing of each section of a tape is preceded by the reading of these three, recorder, hour and day entries. During the processing of a tape section, there may be regular hour entries and these will adjust not only the hour registration but the day registration, for as the hour changes from 00 to 23, at midnight, the date also changes. This usually results in the diminution of the date by 1 but may entail a complete change, such as from 1 to 31, 30, 29 or 28.

The recorder, hour, and day entries are not copied on any one of the output tapes but the registrations are held available to the line pattern connector whereby bits of information are gleaned from different sources to form the required output lines.

The computer acts as a sorting device to sort the various charges into different categories, such as message unit charges, toll charges, detailed records, line observing records and irregular records as well as discards. In addition, in single office marker groups the message unit calls may be further sorted by one digit of their directory numbers. Tapes from multi-office marker groups must be sorted by offices. Where the incoming tape from the assembler contains records for more than one day the detail records may be sorted in days. The controls for these different sorting operations are primarily responsive to the information in the initial entries and are further vested in the set-up switches and certain auxiliary circuits as will more fully appear hereinafter.

A regular message unit (MU) call record consists of three entries, the disconnect time, the answer time and the initial entry and it is not known that this is a message unit record until the initial entry is reached. However, the disconnect time and the answer time are registered and transmitted to the calculator and generally the elapsed time is calculated before the initial entry is registered. All three entries, however, must bear the same call identity index. This is registered upon the registration of the disconnect time and the index with each of the next two entries is compared with it.

Let us take as an example a call made by a subscriber at station SUmmit 6-5444, within the period covered by a record about to be processed. The initial entry for such a call, which happened to be made over a facility identified by the call identity index 27 would be 213027
035444 in which the message billing index (digit C of the first line) is assumed to be 3 and the office index (digit B of the second or first supplementary line) is 3 and which combined with the marker group would identify the office SUmmit 6. Let it be assumed that the call was answered at 11.535 and the disconnect took place at 11.582. The answer timing entry would then be

153527 and the disconnect timing entry would be

158227

Now this call would have been assembled by the assembler and recorded in such manner that it would now be read by the computer in the form:

158227
153527
213027
035444

Therefore, the reader may now be assumed to read the first of these lines:

158227

The control circuits 506, over the path 600, cause the operation of the DTRA—B relay 705 in the timing entry register connector 706 so that the B, C and D digits thereof may be transmitted through the B, C, and D sections of the disconnect time translator designated 1000, 1001 and 1002, respectively, whereupon the three digits 5, 8 and 2 are translated from the two-out-of-five code to the biquinary code, which is peculiarly well adapted for calculation. After translation these three digits are transmitted to the adder 1003 where they are registered in the TD (tens, disconnect), UD (units, disconnect) and PD (tenths, disconnect) adder relays.

At the same time the disconnect time is transmitted to the disconnect time register where a record of this data may be retained until it is certain that it is no longer needed. The arrangement of the disconnect time register 606 and the disconnect time translators 1000, 1001 and 1002 is such that while both are operated by the reader, the latter are then held operated by the register 606. In this sense, the register is needed until the call has been disposed of. However, the register 606 has a regular output which may not always be used. In a regular MU call it is not needed but in a detail call or an irregular call it will be needed. It is, therefore, registered in the disconnect time register until the processing of the data for this call is completed.

The E and F digits 2 and 7, respectively, of this first line of the entry constitute the call identity index and must be registered to identify later entries of this same call. Accordingly, when this line is read by the reader the control circuits 506, over the path 607, cause the operation of the DJR2 relay 608 whereby the E and F readings of the code are transmitted over path 609 to the call identity index register and decimal translator 800. The call identity index is, therefore, retained for reference purposes and for comparison with the call identity index readings of the succeeding entries of this call.

When the disconnect time register 606 up-check circuit and the call identity index register 800 up-check circuits are closed showing a proper registration of this entry, the RS1 reader step relay 700 (circuits not indicated) is operated and the reader is advanced to read the next entry, the answer time.

The answer time line

153527 is now read by the reader. The control circuits 506, over path 600 now cause the operation of the ATRA—B relay 707 whereby the B, C and D digits 535 of this line are transmitted to the B, C and D answer time translators 1004, 1005 and 1006, respectively, for transmission on a biquinary basis to the TA, UA and PA relays of the adder 1003.

As soon as the adder up-check circuits report a satisfactory registration the elapsed time will be calculated. The method of calculating is to express the addend in its natural form, the augend as its nine's complement, to add in a "one" in the lowest denominational order and to ignore, or throw away the "carry one" out of the highest denominational order. Thus, where the disconnect time is 58.2 and the answer time is 53.5 the elapsed time is 4.7 and this is arrived at by adding

```
 582
 464
   1
————
1047
``` wherein the left-hand 1 is discarded so that the result becomes 047.

There are, however, other considerations in calculating the elapsed time and hence the value calculated in the tens order is carried through the hour tens adder 1008 so that 6 (for 60 minutes) or some multiple thereof may be added if there have been one or more hour entries between the disconnect entry and the answer time entry. In the present case we assume there have been no such entries and hence the value 0 is transmitted through the hour tens adder 1008 without change, and the three digits 047 are brought into the elapsed time round-off translator 1307, each to its corresponding denominational order. In actual practice, a small time allowance to cover traffic delay in establishing a connection after the called party has answered and delay in recording the disconnect signal is made and then the call is rounded off to the next higher minute. The details of these operations carried out in the elapsed time round-off translator 1307 are described in detail hereinafter. The output of these translators is chargeable time and as such will be used as described hereinafter. The carry-out from the tens translator goes into the control circuits (not shown) for purposes to be described. The carry-out 0 will indicate a negative result while the carry-out 1 will indicate a normal positive result and will constitute a signal to advance the operations.

As in the case of the disconnect time, the answer time also is registered in the answer time register 708. When the answer time up-check circuit is closed the AUC relay 709 is operated providing the call identity index also checks and the RSI reader step relay is also operated to advance the reader to the first line of the initial entry.

Upon the operation of the ATRA—B answer time register connector relay 707 a ground is extended directly to the JCT—JCU call index check connector relay 610 whereby the E and F digits of the answer time line (constituting the call identity index) are extended for comparison with the call identity index already registered in the call identity index register and decimal translator 800. If the comparison of these numbers proves them to be identical then a check circuit combined with the up-check circuit for the answer time register 708 will cause the operation of the reader step control to advance the tape in the reader so that the first line of the initial entry may be read.

The first line of the initial entry is now read by the reader. The A digit is 2 and since this has been assumed to be an MU record the B digit is 1. The B digit in the first line of each initial entry indicates the general character, message unit, detail or line observing and will cause the operation of a corresponding relay in the input class register 509 which is of prime importance in the later operation of the output class register 1111. In this case the control circuits 506 over the path 607 operate the CLRA—B relay 611. The value in the C digit is transmitted to the billing index register 801 and the call index check connector 612 is operated as before to check the call identity index in the register 800.

The reader line count circuit 508 may actually be considered part of the control circuits 506 and is shown as being operated from the same source and as having a control over these control circuits. It functions to keep a count of the lines of code read for each group of lines constituting the charge data for each call. It is a steering means and is shown as providing a path for the connector relays for the supplementary lines of the initial entry.

Thus, on the first supplementary line of the initial entry which follows the proper entry of the first line and the successful comparison of the call identity index, the reader line count circuit 508 will cause the operation of the NRA—B—C calling number connector relay 613. Thereupon, the B, C, D, E and F digits of this supplementary line will be transferred to and registered in the calling number register and decimal translator 802, so that the output line or lines are now ready to be perforated if everything has been regular.

The B, C and F digits have output paths leading through the sort class connector 1110 to control the sorting of the call in accordance with predetermined conditions, particularly as recorded on the set-up switches.

Meanwhile, during the reading of the lines of the initial entry the computation of the elapsed time has taken place, so that during the registration of the last supplementary line the output is prepared. Assuming everything to be regular and the chargeable time to indicate nine or less message units, then the charge data becomes a single line transmitted to the particular output perforator selected by the sort class connector 1110 and the value of the digit registered in the calling number register 802. Under control of the output class register the DN directory number pattern forming relay 1200 will be operated to control the pattern of the output.

The number of message units is calculated from the computed chargeable time. The output of the elapsed time round-off translator 1307 is transmitted through the message units formula circuit 1201, under control of its connector 1202 and the calculated message units are registered in the message units register 1203. It may be noted that the chargeable time is in some cases also transmitted through the chargeable time translator 1204 and registered in the chargeable time register 1205 where it is available where details are wanted. In the case under assumption it is not needed and will not be used. However, the number of message units calculated and which have been assumed to be capable of being expressed in one digit are available over the F path coming out of the message units register 1203 and are transmitted by the BK1—A relay 1112 in the output class register 1111 to the B group of contacts of the DN relay 1200 so that the B digit of the output line will contain the computed charge in message units.

The calling line number is transmitted from the C, D, E and F parts of the calling number register 802 to the C, D, E and F contacts of the DN relay 1200 so that these digits of the output line will contain this calling line number.

The A digit of the output line is formed through the operation of one of the relays in the output class register 1111, such as the BK1—B relay 1113 so that this is recorded as 1.

Had the number of message units calculated been ten or over and, therefore, been capable of expression only in two decimal digits, then the output becomes a two-line entry with the DN pattern relay 1200 operated for the first and the TMU relay 1206 operated for the second line. In this case, the A digit of the first of these lines is recorded as 2 under control of the BK2—B relay 1114, and the B digit is recorded as 0 under control of the same relay (path not shown). The C, D, E and F digits are derived as before from the calling number register 802.

The second line is formed by the TMU relay 1206. The A and B digits both become 0 under control of one of the relays in the output class register such as the BK2—B relay 1114. The computer connector and control circuit 805 may be set to operate through the call type translator 907 to change the record in the B digit through the TMU relay 1206 from a 0 to a 1 or 2.

The C and D digits are invariably zeros in this line under control of the DAB relay 1115.

The E and F digits are supplied by the output of the message units register 1203.

As each output line is perforated the perforator check circuit 1306 reports the progress of the operations to the perforator control circuits 1309 and after a complete set of charge data lines have been perforated on a selected output tape the individual and specific operating units are released and made ready for another call. Items of general information, such as the hour and the day are retained since this information is common to all the calls within a given section of tape. In actual service there is an overlap operation of elements of the device, consisting of the release of the disconnect and answer registers as soon as it is determined that sufficient information has been stored for the perforation of an output tape. Thus, the disconnect and answer registers may be cleared before the computer has completed its task and the disconnect time and the answer time for the next call may be in process of being registered and may even be completely registered before the remainder of the device is released.

It is not necessary to describe in detail the complete operation in other types of calls. All calls or groups of items of information representing the data for each customer charge consists of three items, a disconnect time, an answer time and an initial entry. In each case the two timing entries are entered first so that they may be placed in the adder at the earliest possible moment so that the computation of the elapsed time may be made as the remaining information is being entered. The simplest case has been described in which certain of the apparatus provided has not been used. In the more complex cases such as the toll or detail call the area and called office register 803 and the called number register 804 are called into use to store information contained in the initial entry and from which information is gleaned by the pattern relays of Figs. 12 and 13 for forming the output lines.

One of the important items on all calls in which the details of the charge are reported is the start time line. This is a line coded from six digits of the day, hour and minutes at which the call is started, generally speaking, the answer time. The tens and units digits of the calendar day are taken from the day register 903, passed through the connector 904 to the day register translator 905 from which the tens digit is passed to the start time line register 906 for combination with the minutes tens digit from the answer time tens translator 1004 to form the B digit of the start time line. In a similar manner, the hour tens digit is taken from the disconnect hour register 902, passed through the start time line register connector 908 and combined in the start time line register with the minutes tens digit from translator 1004 to form the C digit of the start time line. The B and C digits thus formed are transmitted to contacts of the TM pattern relay 1308 for use as required. The D digit of the start time line is the units day digit and, therefore, is the F digit coming out of the day register translator 905. The E digit of the start time line is the units hour digit and, therefore, is the units digit taken from the current or disconnect hour register 902, passed through the start time line register connector 908 and registered in the time pattern register 909. The F digit of the start time line is the units digit of the minutes and comes from the units section of the answer time register 708 and is passed through the start time line register connector 908 and registered in the time pattern register 909.

Thus, the main elements of the computer and their cooperative relationship to each other have been briefly noted and may be summarized as follows. The computer consists of a reader for reading off items of information from an incoming tape, a plurality of registers and translators for storing the information, a calculator for computing charges, a pattern circuit for supervising the lines of a computed charge and a plurality of perforators, selectively taken into service for recording the computed charges under control of the reader.

Supplementary to these regularly employed elements is the straddle circuit which has supervisory functions and acts to keep a constant watch on the operations of the computer so that if there is any deviation from regularity the control is seized and the call is then disposed of under direct control of this circuit. Certain calls such as don't answer and busy calls are discarded and others are recorded on a straddle tape where full details may be spread before a clerk for proper disposition. The important element in this circuit is the entry progress register which has a connection from each of the registers to report the proper operation thereof. Herein is shown, by way of example, the path 614 leading from the disconnect time register 606 to the entry progress register 510 to report the proper entry of the disconnect time. Should the disconnect time fail of registration and the other elements of the call be properly registered then the entry progress register would report a call with only one timing entry and if this were at a leading tape end the straddle input register 511 would be operated, in turn operating the straddle output register so that details of the call would be reported on the straddle tape. There are numerous circumstances by which the straddle circuit takes charge of the output circuit, dealing with numerous causes of irregular calls, all of which are more fully described in the said Joel application.

Feature 1

This feature has been set forth as a safety device whereby the functional operation of the computer cannot be started until the ends of the output tapes have been properly prepared so that none of the records produced may be mutilated. Since the trailing end of one output tape is generally spliced to the leading end of another such tape, space must be left on all such ends for this mechanical joining and these spaces are perforated with what is known as splice pattern so that proper registry may be achieved. Therefore, a tape end preparation means is provided which will start a definite cycle of operations to place a definite minimum number of splice codes on each and every one of the output tapes on which it is expected that records will be placed. When this cycle of operations is started it will automatically continue until completed and will be repeated until at the end of one of these cycles the tape end preparation starting means is found to be returned to normal. Then and only then will the means for starting the functional operation of the computer be effective.

This is shown in a highly schematic form in Fig. 14. Here, the MONB relay 1400, part of the off-normal and start circuit, places a ground on conductor 1401. Should the operator operate the machine start key 1402 this would be ineffective because the circuit would be open at the right-hand contact of the SK relay 1403. Therefore, it is necessary to achieve the operation of the SK relay 1403 before the computer may be placed in functional operation. The only way in which this can be done is to operate the PTE prepare tape end key 1404. This key will extend the ground on conductor 1401 to the winding of the SP relay 1405 and this relay will lock through its right-hand armature and contact to the ground on conductor 1401. The SP relay also closes a circuit for the operation of the SK relay 1403 but maintains the circuit through the machine start key 1402 open at its own left-hand armature and contact. Therefore, as long as the PTE key 1404 is operated the SP relay 1405 will remain operated. The SP relay will also remain operated after the PTE key 1404 has been released until the AT3R relay 1406 is operated to open the locking circuit thereof. In the detailed description in the said Joel case it will be found that the AT3R all tapes three rounds relay 1406 will be operated only after three rounds of nine lines of splice pattern code have been perforated on the ends of all outgoing tapes which will be used with the particular incoming tape identified and checked by the setting of the manual set-up switches. Therefore, after the PTE key has been operated, even though this is of a very temporary nature, the SP relay operates and locks and thereafter controls a complete cycle of tape end preparation. When this tape end preparation is completed, therefore, the AT3R relay 1406 will operate and release the SP relay 1405. The SK relay upon operation locks through its left-hand contact through the ground on conductor 1401 and remains locked thereafter under control of the master off-normal relay 1400.

Thereafter, when the machine start key 1402 is operated or upon the release of the SP relay, if the machine start key 1402 has been operated while this cycle of tape end preparation is under way, then the SPA relay 1407 will be operated and locked to the ground on conductor 1401. The SPA relay whose function it is to signal that the splice pattern has been applied, therefore locks up during the remaining operation of the computer until released in accordance with certain other prearranged conditions. The SPA relay also opens the circuit of the PTE relay 1404 so that an operation of the PTE key will be ineffective to again operate the SP relay during the functional operation of the computer and in this way mutilation of the records on the output tapes through the possibly inadvertent application of splice pattern is avoided.

Feature 2

This feature is a control circuit which directs the tape end preparation and other items which are spread over all the outgoing tapes to only the perforators which are expected to be used. It has been set forth hereinbefore that the computer is equipped with nineteen perforators to thus form nineteen outgoing tapes. The first ten of these perforators are used for the purpose of forming ten message unit tapes 0 to 9, inclusive. When the incoming tape is from a marker group containing but a single office, it is obvious that no sorting by offices is necessary and hence the opportunity is taken of sorting by some digit such as the thousands digit or the units digit of the calling line number. Therefore, when sorting by thousands or units is being undertaken, all ten of the message unit perforators will be used.

However, it may happen that the incoming tape in the reader of the computer is one from a marker group containing, let us say, three offices and, therefore, the first sorting of the message unit calls being processed by the computer is by offices. In this case only the number 0, number 1 and number 2 perforators will be used and, therefore, the perforators 3 to 9 will remain idle during the operation in connection with this particular incoming tape.

This feature then includes a circuit known as the office assignment pattern connector consisting essentially of a plurality of relays TC1 to TC9 shown in Figs. 17 and 18 which relays will be selectively operated in accordance with the setting of the manual set-up switches such as those shown in Fig. 14 and which are explained in detail in the said Joel application. In accordance with this arrangement, the marker group number which is part of the incoming tape identity information and which will have to be checked against the setting of the marker group switches will control the selective operation of one of these TC relays. Let us say in the case just mentioned where the marker group contains but three offices, that the setting of the marker group switches will cause the operation of the TC2 relay 1700. The result of the operation of this relay will be described shortly hereinafter.

When the device is first started the master off-normal relay 1904 will operate to place grounds on various conductors for various purposes as explained in the complete description. Now in accordance with the description of Fig. 14 when the PTE key is operated then the SP relay 1900 will be operated and as a consequence thereof the SPE relay 1902 and the SPD relay 1903 will be operated. As a result of this the ST5 start relay 1707 will respond to start the automatic operations. The CKP relay 1706 is originally operated through a back contact of a relay CKC (not shown), through an operated contact of the ST5 relay 1707. This, however, is only a starting condition and is not shown here. The later operation of the CKP relay throughout the remainder of the operation is from a ground placed on the conductor leading to its winding from any one of the pattern relays, two of which, the DN relay 2000 and the LTD relay 2001, are shown in Fig. 20 and two others, the 081 relay 2203 and the 286 relay 2204, are indicated in Fig. 22.

Now upon the operation of the SPE relay 1902 the ground supplied by the master off-normal relay 1904 is extended through armature 2 and front contact of the SPE relay 1902, the armature 2 and front contact of the STA relay 1701, armature 1 and back contact of the P1 relay 1704, armature 2 and back contact of the OA relay 1705 to the winding of the MU0 relay 1706 and this relay locks through its armature 3 and front contact and a chain circuit controlled by each of the other relays individual to the other eighteen perforators including the DET6 relay 1905 to the front contact and armature 4 of the SPE relay 1902.

Upon the first operation of the CKP relay a circuit is extended from ground, armature 1 and front contact of the CKP relay 1706 through the front contact and armature 1 of the SPE relay 1902, back contact and armature 2 of the AV relay 1709, the front contact and armature 2 of the ST5 relay 1707, over the STA1 conductor, through a chain circuit consisting of the armatures and back contacts of the PLA1 to PLA8 relays shown in Fig. 16, back over the STA conductor to the winding of the STA relay 1701, whereby the STA relay in effect checks the fact that the line count circuit is in properly released condition and that the AV advance relay is in released condition.

On the next reading cycle upon the closure of the K4 contact a ground will be extended over the front contact and armature 1 of the ST5 relay 1707, the LKL1 conductor, thence through a chain circuit including an armature and back contact of all of the PL1 to PL9 relays, a front contact and armature of the PLA1 relay 1601, the LK conductor to the LK relay 1708. It may be noted that this relay will now operate and lock through a back contact of the AV relay 1709 and a back contact of the SKT relay 1713 which locking circuit is not shown here but is mentioned to point out the fact that the LK relay will remain locked through the complete operation of the line count circuit and will not be released until nine lines have been perforated on the MU0 perforator 2004.

During this reading cycle and upon the operation of the LK relay a ground from the H5 contact is extended through the front contact and armature 4 of the ST5 relay 1707 to operate the PC relay 1710 which thereby acts in the same manner as one of the reader contacts. The PC relay 1710 extends a ground through a chain circuit consisting of the back contacts and armatures of the PS1 relay 1711 and the PS2 relay 1712, armature 2 and front contact of the LK relay 1708, the LKA conductor through a chain circuit controlled by the PLA1 to PLA8 relays, back over the PL11 conductor, armature 1 and front contact of the STA relay 1701, the PL1 conductor to operate the PL1 relay 1600.

The PL1 relay 1600 locks through its front contact and armature 2, thence over the LKL1 conductor and now through the armature 1 and front contact of the LK relay 1708, the back contact and armature of the PS relay 2005, the front contact and armature 3 of the LK relay 1708 whereby the locking circuit for the PL relays is held steadily closed until the LK relay 1708 is released after nine lines have been counted.

Also upon the operation of the STA relay 1701, a circuit is extended from ground, armature 4 and front contact of the LK relay 1708, the armature 4 and front contact of the STA relay 1701, through an up-check circuit controlled by this line of perforator selector relays including the MU0 relay 1706 and the DET6 relay 1905 proving that one and one only of these relays has been operated, thence over armature 2 and back contact of the P1 relay 1704, armature 1 and back contact of the P2 relay 1702, armature 2 and front contact of the MU0 relay 1706, armature 1 and back contact of the OA relay 1705, thence through the armature and front contact of the TC2 relay 1700, assumed to be operated in this instance, through the P0D register relay 2002 and the P0A—B—C relay 2003 to connect the MU0 perforator 2004 to the conductors over which the code will be transmitted.

The operation of the SPE relay has released the CKC relay (not shown) and this in turn has released the CKP relay 1706 at the end of a reading interval, so that now upon the operation of the PL1 relay a circuit may be traced from ground, the P1 contact of the reader through the armature 2 and back contact of the CKP relay 1706, the front contact and armature 3 of the ST5 relay 1707, the armature and contact of the motor start relay 2202, the OP conductor coming into a chain circuit controlled by the PL1 to PL9 relays and extending now to the armature 3 and front contact of the PL1 relay over the L1 conductor which may be traced to an armature and front contact of the SPD relay 1903, thence over an armature and back contact of the TET relay 1906 to operate the 081 relay 2203 and in parallel therewith the OP relay 1713. The 081 relay 2203 is a line pattern relay similar to the DN relay 2000 and the LTD relay 2001 and will have the same contact arrangement. Therefore, it will close a circuit to operate the CKP relay 1706 again immediately. It will also close a circuit which will be similar in all respects to a circuit from ground, the armature of the PC relay 1710, an armature and front contact of the pattern relay 081 similar to the armature 2 and front contact of the DN relay 2000, the PA conductor leading to a chain circuit controlled by the PL relays and now extended over armature 1 and front contact of the PL1 relay 1600 to operate the PLA1 relay 1601. This relay will lock to the LKA conductor and at the same time open the PL1 conductor so as to release the STA relay 1701. The PLA— relays, therefore, operate in a reading interval shortly after the start thereof.

Upon the release of the STA relay a ground from armature 2 and front contact of the SPE relay 1902 will now be extended over armature 3 and back contact of the STA relay 1701, through armature 3 and back contact of the P2 relay 1702, back contact and armature 1 of the P3 relay 1703 to operate the P1 relay 1704. This relay now closes a circuit through its armature 3 and front contact, the upper winding of the P2 relay 1702 to the front contact and armature 3 of the SPE relay 1902 so that the P2 relay will be ready to maintain the P1 relay operated and to operate itself when the ground is removed.

At the end of this reading interval the ground over conductor L1 is removed through the opening of the P1 contact and, therefore, the line pattern connector relay. In this instance, the 081 relay 2203 is released and that in turn removes the ground from the PA conductor so that the original operating circuit of the PLA1 relay 1601 is opened. The PLA1 relay, however, is held locked over the LKA conductor which may be traced through the front contact and armature 2 of the LK relay through the armature 5 and front contact of the ST5 relay 1707 and the back contact and armature 2 of the SKT relay 1713.

The PS relays such as the PS relay 2005 and the PS1 relay 1711 and the PS2 relay 1712 operate shortly after the beginning of a reading cycle though their circuits are not shown in this schematic drawing. These relays operate in pairs, the PS and the PS1 relays in one instance and the PS and PS2 relays in another instance, controlling odd and even circuits of the perforator selector relays. We are not concerned with this function at present but only the over-all effect of the PS relay. This relay, therefore, operates early in a reading cycle and, therefore, opens the locking circuit vested in the LKL1 conductor so that after the PL1 relay has been operated it remains operated dependent upon the K4 conductor connected over the front contact and armature 1 of the ST5 relay 1701. Therefore, upon the opening of the original circuit for the operation of PL1, this relay releases and this happens at the end of a reading cycle.

Shortly after the end of a reading cycle upon the release of the PC relay 1710 a circuit is established from ground, the armature and back contact of this PC relay 1710 over a front contact and armature of either the PS1 relay 1711 or the PS2 relay 1712 whichever has been operated during the previous reading cycle, thence over the PL conductor and the chain contacts controlled by the PLA3 relays through the PLA1 relay 1601 which is now operated to operate the PL2 relay 1602. Therefore, the PL2 relay operates during what is known as the open interval of the reader cycle so that on the next reader cycle ground from the P1 contact over the armature 2 and back contact of the CKP relay 1706 and the front contact and armature 3 of the ST5 relay 1707 may be extended over the OP conductor to the L2 conductor now extended through an armature and front contact of the SPD relay 1903 to again operate the 081 relay 2203. The renewed operation of this pattern relay will then again close a ground to the PA conductor whereby the PLA2 relay 1603 will be operated. It may be noted in all instances that when a relay such as the PL2 operates its opens the locking circuit for the PL1 relay 1600 and this relay releases and in a similar manner when the PLA2 relay 1603 operates it opens the locking circuit of the PLA1 relay 1601 and so this relay releases. Therefore, the line count circuit advances with the PL relays operating shortly after the end of a reading cycle to prepare the circuit for the selection of the pattern relay at the beginning of the next reader cycle and at this time the correspondingly numbered PLA relay is operated and locked. At the end of a reading cycle the PL relay is released but the correspondingly numbered PLA relay remains locked.

In this manner then during nine reading intervals the PL1 to PL9 relays will be successively operated and through the corresponding nine operations of the 081 relay 2203 the splice code 081010 is perforated in the tape in the MU0 perforator 2004.

During the ninth reading interval, ground is extended from the P1 contact of the reader over the armature 2 and back contact of the CKP relay 1706, the front contact and armature 3 of the ST5 relay 1707, the armature and front contact of the MST relay 2202, over the OP conductor now switched by the PL9 relay 1604 to the L9 conductor and this in the manner hereinbefore described will be extended to cause the operation of the 081 relay 2203 so that the MU0 perforator 2004 will perforate a ninth line of the 081010 code on its tape. Upon the operation of the 081 relay 2203 the PC1 relay will extend a ground over its armature and front contact and thence over contacts controlled by the 081 relay to the PA lead now switched by the PL9 relay 1604 to the AV lead at this point occupying a similar circuit position as would a PLA9 relay. Therefore, instead of another PLA relay being operated the ground will be extended to the AV advance relay 1709 and cause its operation. The advance relay at its armature 2 opens the circuit for the STA relay 1701 to prevent its operation momentarily. The advance relay in operating opens the locking circuit of the LK relay 1708 so that this relay now releases, thus releasing all of the relays which it has held locked up to this time such, by way of example, as the PLA8 relay 1605 so that the circuit now returns to normal and will have to be restarted. This means that in the manner hereinbefore described the STA relay 1701 will again be operated upon the following release of the AV relay 1709. With this operation of the STA relay the ground extended to armature 3 of the P2 relay 1709 is removed and, therefore, the original operating ground for the P1 relay is opened. However, this relay remains operated from the master off-normal ground through the armature 3 and front contact of the SPE relay 1902, the upper winding of the P2 relay 1702, the front contact and armature 3 of the P1 relay 1704, the back contact and armature of the P3 relay 1703 to the winding of the P1 relay 1704. Now upon the operation of the STA relay 1701, ground over armature 2 and front contact of the SPE relay 1902 is extended through the armature 2 and front contact of the STA relay 1701, armature 1 and front contact of the P1 relay 1704, through armature 1 and front contact of the MU0 relay 1706 to the winding of the MU1 relay 1715. The MU1 relay will now lock to the circuit heretofore provided for the locking of the MU0 relay 1706 and at the same time open the locking circuit for this relay so that the MU0 relay 1706 releases.

Now upon the operation of the LK relay 1708, ground supplied by its armature 4 and front contact is extended through the up-check circuit proving that the MU1 relay alone in this series of relays is operated through the armature 2 and front contact of the P1 relay 1704, the armature 2 and front contact of the P2 relay 1702, the armature 2 and front contact of the MU1 relay 1715, the armature and front contact of the TC2 relay 1700 to the winding of the P1D relay 2006 and the P1A—B—C relay 2007 so that the next perforator, the MU1 perforator 2008, is enabled.

In this manner the various perforators which are to be used will each be enabled in turn and while so enabled will be caused to perforate nine lines of the 081010 code thereon.

We have assumed that the TC2 relay will be operated at the present time. This means that the MU0, the MU1 and the MU2 perforators will each be enabled and will each have its tape end prepared. However, when the regular course of operations in accordance with the plan herein described is followed, the MU3 relay 1800 will be operated in turn and when a ground is extended over its armature and front contact, it will be switched by the TC2 relay in this instance to the common conductor 1801 leading to the winding of the SKT relay 1714 so that this relay will operate and will immediately place a ground through its armature 3 on the winding of the AV relay 1709 to cause the advance to the next perforator relay. The perforator register relay 2100 and the perforator connector relay 2101 are not operated at this time nor are any of the PL or PLA relays of the line count circuit operated. On the next reading interval the MU4 relay 1802 will be operated and again the TC relay will cause the operation of the SKT relay 1714 instead of one of the perforator connector relays and thus the remaining MU relays will be operated in turn on succeeding reader cycles but no perforations will be made in the output tapes controlled thereby.

At the end of the operation when the DET6 relay is operated then upon the operation of the AV relay 1709 and after the last reading cycle has been completed the ground on the J8 contact will be extended over armature 3 and front contact of the AV relay 1709 to conductor 1716 which will be extended by armature 3 and front contact of the DET6 relay 1905 through the back contact and armature 1 of the ATIS relay 2200 to the winding of the ATIR relay 2205 so that this marks the completion of the perforating of one block of nine lines of splice code on each of the tapes which will be used in the following operation of the computer.

Upon the operation of the ATIR relay a circuit is closed from the armature and front contact thereof, through the winding of the ATIS relay 2200 to a ground supplied by the SP relay 1900 on the conductor 1901 but the ATIS relay cannot operate until the ground is removed from the front contact of armature 1 thereof at the end of the reading cycle. When this occurs, then the ATIR relay 2205 will be maintained operated in series with the winding of the ATIS relay 2200 and this relay in turn will become operated.

The SPE and SPD relays which were described hereinbefore as operating in response to the operation of the SP relay 1900 have a locking circuit, not shown here but described in detail in the said Joel application, which is controlled by the AT—R and AT—S relays. Therefore, upon the operation of the ATIR relay 2205, the SPE relay 1902 and the SPD relay 1903 will be momentarily released so as to open the locking circuit of the DET6 relay 1905, thus restoring the condition of these perforator selector relays to normal whereupon the cycle of operations described will be started again and will be repeated in the same manner as that described. The ATIR relay 2205 and the ATIS relay 2200 will be maintained operated and at the end upon the next energization of the DET6 relay 1905 a circuit will be established for the energization of the AT2R relay 2206 and thereafter the AT2S relay 2201.

At the end of the third cycle in which a third block of 081010 codes is perforated on the end of each tape the AT3R relay 2207 will be operated.

As indicated in Fig. 14 upon the operation of the AT3R relay, the SP relay will be unlocked and, therefore, the automatic preparation of the tape ends will cease if the PTE key has been previously restored to normal.

If the PTE key has not been restored to normal the SP relay will remain operated, whereupon the cycle of operations will be started again. The AT3R relay releases when the J8 cam contact opens.

Thus, it will be seen that since the marker group identified in the tape identity information on the end of the incoming tape and registered in the set-up switches will indicate that an office sort into three MU tapes must be made and that, therefore, only three MU output tapes need be prepared, the TC2 relay will be operated under these conditions actually by the registration on the set-up switches and, therefore, will prevent the tape end preparation of those tapes made by the MU3 to MU9 perforators, inclusive.

In a similar manner, the CDT1 to CDT6 relays of Fig. 22 will control the DET1 to DET6 perforators so that if all of these will not be used then the preparation of some may be skipped. For instance, if the round as denoted by the setting of the two switches 1907 and 1908 is a round of only three days as denoted by the first and last day of round switches 1909 and 1910, respectively, then only three output tapes will be necessary and, therefore, only the DET1, DET2 and the DET3 perforators will be enabled. When the DET4 relay 1911 is operated then a ground over its armature 2 and front contact will be extended by the armature 3 and front contact of the CDT4 relay 2209 to the conductor 2210 to operate the SKT relay 1714. This will cause the operation of the advance AV relay 1709 so that in the absence of the line pattern connector relay 2203 and the perforator connector relays for the DET4 perforator the next relay in turn the DET5 relay 1912 will be operated.

As another example of a spreading operation, let it be assumed that after the tape identity information has been placed on all of the output tapes which are to be used at the end of operations and that the TET trailing end tape relay 1906 has been operated. In this case, when the L1 conductor from the front contact of armature 3 of the PL1 relay 1600 is grounded this ground will now be extended over the armature and front contact of the TET relay 1906, thence over the armature 4 and back contact of the ATIS relay 2200 to the 286 pattern relay 2204. This relay will place a code on the twenty-eight conductors going through the perforator connector so that the code 286000 will be placed on each one of the output tapes.

It may be noted that in preparing the trailing tape end that the first block of nine codes placed thereon is the tape identity codes 2891XX to 2899XX after which the ATIS relay 2200 will be operated. When the second block of nine codes is to be perforated the skip splice code 286000 is the first line to be perforated after which there will be eight of the 081010 codes and following this the AT2S relay will be operated. The third block of nine codes will be solid 081010 splice codes. This may explain the reason for using the supplementary counting scheme consisting of the ATIS to AT3R relays so as to provide a tape end preparation of twenty-seven lines. In the preparation of the leading end of the tape there are three solid blocks of splice code 081010 so that disregarding the difference between trailing end and leading end the following operations will take place.

As the line count circuit of Fig. 16 operates, then the next operation will be signalled by the ground on conductor L2 which now is extended to the 081 relay 2203 instead of to the 286 relay 2204 and the other counts of this line count circuit will be similarly extended to operate the 081 relay. Thus, it will be seen that on the trailing end of the tape when the spread of the splice pattern is to be made, the first code will be changed to 286000 and the other eight codes will be 081010 in regular order. At the end of this block of nine perforations the ATIS relay 2200 will be operated so that upon the next round of operations the L1 conductor extended over the front contact of the TET relay will now be further extended over the front contact and armature 3 of the ATIS relay 2200 so that all nine lines of this entry will be 081010.

Now, one of the features of this so-called funnel circuit is a means for directing an item normally destined for one of the perforators which has not been enabled into one which has been enabled. By way of example, let us assume that the first day of round switch 1909 has been set at 2, the next day of round switch 1910 has been set at 3 and the round switches 1907 and 1908 have been set at 2. This means that if the computer circuits have been arranged to accommodate records made on the basis of six rounds in a month the device is now set to process the records for the 12th (the second day of round 2; the rounds are counted 0, 1, 2, etc.) and the 13th (the third day of round 2). However, the tapes are cut in such a manner that records from 3:00 A. M. on the 12th to 3:00 A. M. on the 14th are included, so it appears that there will be a few records from midnight the 13th to 3:00 A. M. on the 14th which statistically belong in the fourth day of round 2 and these will not be put on a separate tape but will be funneled to the output tape including the records for the third day of round 2. This is accomplished in the following manner. The DET2 perforator 2211 will be used for the records of the second day of the round and the DET3 perforator 2212 will be used for the records for the third day of the round. The DET1 perforator 2213, the DET4 perforator 2214, the DET5 perforator 2215 and the DET6 perforator 2217 will be left idle. The SPA relay 1913 extends a ground over the first day of round switch 1909 to the conductor marked 2 (second day of round) to cause the energization of the CDT1 relay 2218 so that in a spreading operation when the DET1 relay 1914 is operated the circuit from its front contact of armature 2 instead of being extended normally to enable the DET1 perforator 2213 will now be routed to the common conductor 2210 to operate the SKT relay 1714 for the purpose of skipping this perforator as hereinbefore described.

In the same manner a ground extended by the SPA relay 1913 will be extended through the last day of round switch arm 1910 to the No. 3 conductor (third day of round) and thereover to the lower winding of the CDT4 relay 2209 and this relay in operating will further extend this ground over its armature 2 and front contact to the winding of the CDT5 relay 2219 and this again in turn will cause the operation of the CDT6 relay 2220 so that the DET4, DET5 and DET6 perforators are rendered ineffective and any attempt to place an item of information over one of these perforators will be skipped through the operation of the LL relay 1719.

Now, when an item is to be perforated on one of the DET perforators then the day register translator 1915 will translate the date (let us assume the 12th) into a ground placed on the DT2 conductor (day 2, round 2) so that this ground may be extended over armature 4 and back contact of the CDT2 relay 2221 to enable the DET2 perforator 2211. In a similar manner that day register translator 1915 will translate the 13th into a grounding of the DT conductor 3 which will be extended over armature 4 and back contact of the CDT3 relay 2222 to enable the DET3 perforator 2212. If an item comes in characterized by the date 14 then the day register translator will translate this into a grounding of the DT4 conductor which is connected to armature 4 of the CDT4 relay 2209. This relay, however, is operated at this time so the ground is extended over its armature 4 and front contact, thence over the armature 4 and front contact of the CDT3 relay 2219, the armature 2 and front contact of the CDT6 relay 2210, the armature 5 and front contact of the CDT5 relay 2219, the armature 5 and front contact of the CDT4 relay 2209, the armature 5 and back contact of the CDT3 relay 2222 to enable the DET3 perforator 2212. Thus, an item for the 14th or the fourth day of round 2 is funneled to the perforator making the records for the third day of round 2.

As another example and assuming that in some manner an item dated the 11th (first day of round 2) was processed, then the day register translator 1915 would ground a conductor No. 3 extending into the round switch 1907 which will be in connection with this particular conductor (the switch arm is shown in the off position and counting in a clockwise direction 0, 1, 2, the switch arm will be in connection with conductor No. 3), thence over the DT1 conductor to armature 2 and front contact of the CDT1 relay 2218, thence to armature 4 and back contact of the CDT2 relay 2221 to enable the DET2 perforator so that an item for the first day of round will be automatically funneled to the perforator recording items for the second day of the round.

The internal arrangements of the day register translator are fully set forth in the said Joel application.

*Feature 3*

This has been stated as a sequence or walking circuit used for gaining access to each of the perforators in turn especially in spreading an item of general information on all output tapes. The circuit consists generally of the nineteen relays NU0 to DET6 hereinbefore described. As an essential part of the control there are provided three relays P1, P2 and P3 which translate successive impulses provided by the action of the STA relay 1701 into alternate (odd and even) access to two pairs of conductors controlled by these walking circuit relays so that upon the operation of one the circuits for the next are prepared. After the automatic operation has been started and one of these, say the MU0 relay 1715, has been operated, then the release of the STA relay 1701 operates the P1 or the P3 relay and prepares the circuit for the next relay in succession, say the MU1 relay 1715.

This walking circuit in combination with the means for operating the SKT relay 1714 or the LL relay 1719 for skipping the unassigned perforators has been described in some detail hereinbefore.

Feature 4

This feature has been set forth as the combination of a line counting means and a progress circuit for sequentially connecting the various outlet perforators to a code control circuit whereby a block of a counted number of lines may be spread on all the output tapes and as an extension of this arrangement the further combination with an auxiliary counting means for counting the number of said blocks. This has been fully described hereinabove. The line counting circuit consists of the PL and PLA relays of Fig. 16 and the auxiliary counting circuit consists of the ATIR to AT3R, the ATIS and the AT2S relays of Fig. 22.

This arrangement is a generic form of the safety circuit also set forth in the said Eppel application, wherein certain specific improvements are disclosed.

What is claimed is:

1. The combination of a record scanner, a plurality of devices for producing records, a manual means for starting an automatic operation for preparing each of the said plurality of devices but not effecting actuation of a means to produce a record, a manual start means for starting the operation of said scanner and said record producing devices and means under control of said first manual means for rendering said second-named manual start means actuative to effect recording.

2. The combination of a record scanner, a plurality of devices for producing records, a circuit responsive to records scanned by said scanner for selecting one of said record producing devices and for recording thereon the said scanned record, automatic means for sequentially producing a precautionary record on each of said record producing devices, a manual means for starting said automatic means, a manual means for starting the operation of said circuit and means under control of and dependent upon a complete cycle of operation of said automatic means for rendering said circuit starting means effective to produce records.

3. In a device for processing coded items of information recorded on a continuous strip, by sorting, translating, computing or otherwise rearranging said coded items of information on a plurality of other continuous strips, a plurality of recorders each for recording items of information on one of said other continuous strips, a start key for placing said device into operation, an automatic circuit arrangement for sequentially enabling said recorders for preparing the said plurality of other continuous strips in readiness to receive said processed items of information, a circuit for synthesizing a special code for recording on said other continuous strips, said automatic circuit having means to connect said synthesizing circuit to each said recorder in turn, and means responsive to the operation of said preparing means for rendering said start key effective to produce a record.

4. In a device for processing coded items of information recorded by perforated codes on a continuous strip by sorting, translating, computing or otherwise rearranging said coded items of information on a plurality of other continuous strips, said device comprising a reader for reading off items of information on said continuous strip, and a plurality of perforators for perforating coded items of information on a plurality of other continuous strips, a start key for placing said device into operation, means for preparing the leading ends of each of said other continuous strips by recording therein certain special perforated codes, said last means including a circuit for synthesizing special codes, and an automatic sequencing circuit for successively applying said synthesizing circuit to each of said perforators, each said perforator being responsive to said synthesizing circuit to perforate a corresponding special code in its continuous strip, and means responsive to the completion of a plurality of cycles of such sequential operations for rendering said start key effective to produce records.

5. In a device for processing coded items of information perforated in an incoming tape by sorting, translating, computing or otherwise rearranging said coded items of information on a plurality of outgoing tapes, said device including a reader for reading off the said coded items of information from said incoming tape, and a plurality of perforators for perforating in each of said outgoing tapes coded items of information, a start key for placing said device into operation, means for recording in the leading ends of each of said outgoing tapes special codes, said means comprising a spreading means for sequentially recording one of said special items in a cycle in each of said outgoing tapes, a circuit for synthesizing said special codes, said spreading means including means to successively connect said synthesizing circuit to each of said perforators, means for operating said spreading means repeatedly, and means responsive to the completion of a given cycle of said spreading means for rendering said start key effective to produce a record.

6. In a device for processing coded items of information perforated in an incoming tape by sorting, translating, computing or otherwise rearranging said coded items of information on a plurality of outgoing tapes, said device including a reader for reading off the said coded items of information from said incoming tape, a plurality of perforators for perforating in each of said outgoing tapes coded items of information derived from said items read from said incoming tape, a means for spreading, by sequentially perforating the same code on each said outgoing tape, a predetermined plurality of special codes on the ends of said outgoing tapes to facilitate the mechanical splicing of said outgoing tapes to form a continuous tape for use as an incoming tape in the same or another processing device, said spreading means including an automatic sequencing circuit, a synthesizing circuit for transmitting said special splice code successively under control of said automatic sequencing circuit to each of said perforators, a normally ineffective start key for placing said device into operation, a means for starting said special tape end spreading means, and means responsive to the completion of a plurality of cycles of operation of said spreading means for rendering said start key effective to produce records.

7. In a device for processing coded items of information perforated in an incoming tape by sorting, translating, computing or otherwise rearranging said coded items of information on a plurality of outgoing tapes, means for preparing the ends of said outgoing tapes for splicing into a continuous tape for use as an incoming tape in the same or another processing device by perforating therein a plurality of splice codes, said means including an automatic control for insuring the completion of a given number of cycles of spreading defined as the sequential perforation of the same code on each said outgoing tape, a normally ineffective start key for placing said device into functional operation, start relay means for preparing said device for functional operation, a tape end preparation key for starting said automatic control means and means jointly controlled by the restoration of said tape end preparation key and the completion thereafter of a given plurality of cycles of operation of said automatic control means to render said start relay means responsive to said start key.

8. In a system for processing coded items of information representing customer uses of facilities over variable time periods perforated in an incoming tape by sorting, translating, computing or otherwise rearranging said coded items of information on a plurality of outgoing tapes, an assembler for assembling said coded items of information into groups each representing the record of a customer use of the said facilities, a processing device including a reader for reading off the said coded items of information from said incoming tape, a plurality of perforators for perforating in each of said outgoing tapes coded items of information derived from said items read from said incoming tape, said items of information including items identifying the round (an arbitrary division of a month for commercial billing purposes) and the day of the round for each said group of items, a means for presetting said device for processing groups of items for a given round and for particular consecutive days of a round, means responsive to said presetting means for enabling only a number of said perforators corresponding to the number of designated days of a round, and means for routing derived groups of said items of information to perforators corresponding in number to the day of a round identified in said group.

9. In a system for processing coded items of information representing customer uses of facilities over variable time periods perforated in an incoming tape by sorting, translating, computing or otherwise rearranging said coded items of information on a plurality of outgoing tapes, an assembler for assembling said coded items of information into groups each representing the record of a customer use of the said facilities, a processing device including a reader for reading off the said coded items of information from said incoming tape, a plurality of perforators for perforating in each of said outgoing tapes coded items of information derived from said items read from said incoming tape, said items of information including items identifying the round (an arbitrary division of a month for commercial billing purposes) and the day of the round for each said group of items, a means for presetting said device for processing groups of items for a given round and for particular consecutive days of a round, means responsive to said presetting means for enabling only a number of said perforators corresponding to the number of designated days of a round, means for routing derived groups of said items of information to perforators corresponding in number to the day of a round identified in said group, and means for routing a derived group of items of information identified as belonging to a day of round next before the preset first day of round or next after the preset last day of round for routing said derived group to said perforator assigned to said first day of round or to said perforator assigned to said last day of round, respectively.

10. In a system for processing coded items of information representing customer uses of facilities over variable time periods perforated in an incoming tape by sorting, translating, computing or otherwise rearranging said coded items of information on a plurality of outgoing tapes, an assembler for assembling said coded items of information into groups each representing the record of a customer use of the said facilities, a processing device including a reader for reading off the said coded items of information from said incoming tape, a plurality of perforators for perforating in each of said outgoing tapes coded items of information derived from said items read from said incoming tape, said items of information including items identifying the round (an arbitrary division of a month for commercial billing purposes) and the day of the round for each said group of items, a means for presetting said device for processing groups of items for a given round and for particular consecutive days of a round, means responsive to said presetting means for enabling only a number of said perforators corresponding to the number of designated days of a round, means for routing derived groups of said items of information to perforators corresponding in number to the day of a round identified in said group, means for spreading by sequentially perforating the same code on each said outgoing tape a predetermined plurality of special codes on the ends of said outgoing tapes to facilitate the mechanical splicing of said outgoing tapes to form a continuous tape for use as an incoming tape in the same or another processing device, and means controlled by said presetting means for limiting the said tape and preparation to only the tapes in the said perforators assigned for use thereby.

11. In a system for processing coded items of information representing customer uses of facilities over variable time periods perforated in an incoming tape by sorting, translating, computing or otherwise rearranging said coded items of information on a plurality of outgoing tapes, a processing device including a reader for reading off the said coded items of information from said incoming tape, a plurality of perforators for perforating in each of said outgoing tapes coded items of information derived from said items read from said incoming tape, said items of information on said incoming tape including information identifying a particular outgoing tape on which the items of information derived therefrom are to be perforated, a means in said device for determining which of said plurality of perforators of outgoing tape shall be used, a progress chain of relays each associated with one of said perforators for sequentially enabling said perforators, and a means common to said chain of relays responsive to the operation of each of said relays associated with an unassigned perforator for advancing the sequential operation of said relay chain.

12. In a system for processing coded items of information representing customer uses of facilities over variable time periods perforated in an incoming tape by sorting, translating, computing or otherwise rearranging said coded items of information on a plurality of outgoing tapes, a processing device including a reader for reading off the said coded items of information from said incoming tape, a plurality of perforators for perforating in each of said outgoing tapes coded items of information derived from said items read from said incoming tape, a progress chain of relays each associated with one of said perforators for sequentially enabling said perforators, means in said device for transmitting a particular coded item of information to an enabled perforator, and counting means for controlling a multiple operation of said transmitting means a predetermined number of times whereby a block of a given number of a particular coded item of information may be spread on the said outgoing tapes.

13. In a system for processing coded items of information representing customer uses of facilities over variable time periods perforated in an incoming tape by sorting, translating, computing or otherwise rearranging said coded items of information on a plurality of outgoing tapes, a processing device including a reader for reading off the said coded items of information from said incoming tape, a plurality of perforators for perforating in each of said outgoing tapes coded items of information derived from said items read from said incoming tape, a progress chain of relays each associated with one of said perforators for sequentially enabling said perforators, means in said device for transmitting a particular coded item of information to an enabled perforator, a counting means for controlling a multiple operation of said transmitting means, a tape end key for starting an automatic operation controlled through the combination of said progress chain of relays and said counting means whereby a block of a given number of particular coded items of information may be spread on said outgoing tapes.

14. In a system for processing coded items of information representing customer uses of facilities over variable time periods perforated in an incoming tape by sorting, translating, computing or otherwise rearranging said coded items of information on a plurality of outgoing tapes, a processing device including a reader for reading off the said coded items of information from said incoming tape, a plurality of perforators for perforating in each of said outgoing tapes coded items of information derived from said items read from said incoming tape, a progress chain of relays each associated with one of said perforators for sequentially enabling said perforators, means in said device for transmitting a particular coded item of information to an enabled perforator, a counting means for controlling a multiple operation of said transmitting means, a tape end key for starting an automatic operation controlled through the combination of said progress chain of relays and said counting means whereby a block of a given number of particular coded items of information may be spread on said outgoing tapes, and another counting means for counting the number of said blocks perforated on each of said outgoing tapes.

15. In a system for processing coded items of information representing customer uses of facilities over variable time periods perforated in an incoming tape by sorting, translating, computing or otherwise rearranging said coded items of information on a plurality of outgoing tapes, a processing device including a reader for reading off the said coded items of information from said incoming tape, a plurality of perforators for perforating in each of said outgoing tapes coded items of information derived from said items read from said incoming tape, a progress chain of relays each associated with one of said perforators for sequentially enabling said perforators, means in said device for transmitting a particular coded item of information to an enabled perforator, counting means for controlling a multiple operation of said transmitting means a predetermined number of times, a tape end key for starting an automatic cooperative operation of said progress chain and said counting means, another counting means for counting a predetermined number of complete operations of said counting chain, means responsive to the release of said tape end key for stopping the said spreading operation after a predetermined number of operations of said progress chain have been completed whereby the ends of each said output tape may be perforated with a predetermined number of blocks of coded items of information each containing a particular number of said items.

ROBERT O. RIPPERE.

No references cited.